United States Patent
Choi

(10) Patent No.: US 7,966,446 B2
(45) Date of Patent: Jun. 21, 2011

(54) MEMORY SYSTEM AND METHOD HAVING POINT-TO-POINT LINK

(75) Inventor: Joo-Sun Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 176 days.

(21) Appl. No.: 11/451,802

(22) Filed: Jun. 13, 2006

(65) Prior Publication Data

US 2007/0061614 A1    Mar. 15, 2007

Related U.S. Application Data

(60) Provisional application No. 60/716,587, filed on Sep. 13, 2005.

(30) Foreign Application Priority Data

Sep. 12, 2005  (KR) .................. 10-2005-0084813
Sep. 20, 2005  (KR) .................. 10-2005-0087212

(51) Int. Cl.
*G06F 12/00*    (2006.01)
*G06F 13/00*    (2006.01)
*G06F 13/28*    (2006.01)

(52) U.S. Cl. ............. 711/105; 711/5; 711/100; 711/118
(58) Field of Classification Search .............. 711/100, 711/105, 118, 5
See application file for complete search history.

(56) References Cited

U.S. PATENT DOCUMENTS

| | | | |
|---|---|---|---|
| 5,715,274 A * | 2/1998 | Rostoker et al. ............. | 375/130 |
| 6,243,776 B1 | 6/2001 | Lattimore et al. | |
| 6,493,250 B2 * | 12/2002 | Halbert et al. ............. | 365/63 |
| 6,587,912 B2 * | 7/2003 | Leddige et al. ............. | 711/5 |
| 6,639,820 B1 | 10/2003 | Khandekar et al. | |
| 6,880,056 B2 * | 4/2005 | Kootstra ............. | 711/168 |
| 6,938,129 B2 * | 8/2005 | David ............. | 711/144 |
| 6,950,342 B2 | 9/2005 | Lindhorst et al. | |
| 6,982,892 B2 * | 1/2006 | Lee et al. ............. | 365/63 |

(Continued)

FOREIGN PATENT DOCUMENTS

JP    2002-007308    1/2002

(Continued)

OTHER PUBLICATIONS

Chinese Office Action dated Dec. 25, 2009 issued in corresponding Chinese Application No. 200610153630.8.

*Primary Examiner* — Stephen C Elmore
*Assistant Examiner* — Mark A Giardino, Jr.
(74) *Attorney, Agent, or Firm* — Mills & Onello LLP

(57) ABSTRACT

A memory system includes a controller for generating a control signal and a primary memory for receiving the control signal from the controller. A secondary memory is coupled to the primary memory, the secondary memory being adapted to receive the control signal from the primary memory. The control signal defines a background operation to be performed by one of the primary and secondary memories and a foreground operation to be performed by the other of the primary and secondary memories. The primary memory and the secondary memory are connected by a point-to-point link. At least one of the links between the primary and secondary memories can be an at least partially serialized link. At least one of the primary and secondary memories can include an on-board internal cache memory.

33 Claims, 26 Drawing Sheets

U.S. PATENT DOCUMENTS

| | | | |
|---|---|---|---|
| 7,091,741 B2 | 8/2006 | Kim | |
| 7,308,524 B2 * | 12/2007 | Grundy et al. | 711/103 |
| 2002/0023191 A1 | 2/2002 | Fudeyasu | 711/104 |
| 2002/0180480 A1 | 12/2002 | Dreps et al. | |
| 2003/0126356 A1 * | 7/2003 | Gustavson et al. | 711/105 |
| 2004/0148482 A1 | 7/2004 | Grundy et al. | |
| 2004/0230718 A1 * | 11/2004 | Polzin et al. | 710/22 |
| 2005/0068067 A1 | 3/2005 | Kim | |
| 2006/0044860 A1 | 3/2006 | Kinsley et al. | |
| 2006/0047899 A1 * | 3/2006 | Ilda et al. | 711/113 |
| 2006/0101167 A1 | 5/2006 | To et al. | |

FOREIGN PATENT DOCUMENTS

| | | |
|---|---|---|
| KR | 20030039179 | 5/2003 |
| KR | 1020050030293 | 3/2005 |
| KR | 1020050062750 | 6/2005 |

* cited by examiner

|  | PRIMARY MEMORY WRITE/READ | SECONDARY MEMORY WRITE/READ |
|---|---|---|
| SECONDARY STATE | STAND-BY | ACTIVE |
| PRIMARY STATE | ACTIVE | TRANSFER |

FIG. 11

| CS0 | CS1 | SELECT |
|---|---|---|
| 0 | 0 | RANK0 |
| 0 | 1 | RANK1 |
| 1 | 0 | RANK2 |
| 1 | 1 | RFU |

FIG. 12

| RS0 | RS1 | RS2 | SELECT |
|---|---|---|---|
| 0 | 0 | 0 | NOP |
| 0 | 0 | 1 | RANK2 |
| 0 | 1 | 0 | RANK1 |
| 0 | 1 | 1 | RANK1/2 |
| 1 | 0 | 0 | RANK0 |
| 1 | 0 | 1 | RANK0/2 |
| 1 | 1 | 0 | RANK0/1 |
| 1 | 1 | 1 | RANK0/1/2 (NOP) |

FIG. 13

| FOP3 | FOP2 | FOP1 | FOP0 | COMMAND |
|---|---|---|---|---|
| 0 | 0 | 0 | 0 | NOP |
| 0 | 0 | 0 | 1 | ROW ACTIVATION |
| 0 | 0 | 1 | 0 | READ |
| 0 | 0 | 1 | 1 | WRITE |
| 0 | 1 | 0 | 0 | READ WITH AP |
| 0 | 1 | 0 | 1 | WRITE WITH AP |
| 0 | 1 | 1 | 0 | AUTO REFRESH |
| 0 | 1 | 1 | 1 | SELF REFRESH |
| 1 | 0 | 0 | 0 | POWER DOWN #1 |
| 1 | 0 | 0 | 1 | POWER DOWN #2 |
| 1 | 0 | 1 | 0 | PRECHARGE |
| 1 | 0 | 1 | 1 | PRECHARGE ALL |
| 1 | 1 | 0 | 0 | RFU |
| 1 | 1 | 0 | 1 | RFU |
| 1 | 1 | 1 | 0 | CACHE ENABLE |
| 1 | 1 | 1 | 1 | MRS |

| BOP3 | BOP2 | BOP1 | BOP0 | COMMAND |
|---|---|---|---|---|
| 0 | 0 | 0 | 0 | NOP |
| 0 | 0 | 0 | 1 | ROW ACTIVATION |
| 0 | 0 | 1 | 0 | READ |
| 0 | 0 | 1 | 1 | NOP |
| 0 | 1 | 0 | 0 | READ WITH AP |
| 0 | 1 | 0 | 1 | NOP |
| 0 | 1 | 1 | 0 | AUTO REFRESH |
| 0 | 1 | 1 | 1 | SELF REFRESH |
| 1 | 0 | 0 | 0 | POWER DOWN #1 |
| 1 | 0 | 0 | 1 | POWER DOWN #2 |
| 1 | 0 | 1 | 0 | PRECHARGE |
| 1 | 0 | 1 | 1 | PRECHARGE ALL |
| 1 | 1 | 0 | 0 | RFU |
| 1 | 1 | 0 | 1 | RFU |
| 1 | 1 | 1 | 0 | RFU |
| 1 | 1 | 1 | 1 | MRS |

| 0 | BA3 | A10 | A1 | | 1 | BA3 | A10 | A1 | |
|---|-----|-----|----|--|---|-----|-----|----|--|
| 0 | BA2 | A9  | A0 | | 0 | BA2 | A9  | A0 | |
| 1 | BA1 | A8  |    | | 0 | BA1 | A8  |    | |
| 0 | BA0 | A7  |    | | 0 | BA0 | A7  |    | |
| 0 | A14 | A6  |    | | 0 | A14 | A6  |    | |
|   | A13 | A5  |    | | 1 | A13 | A5  |    | |
| 1 | A12 | A4  |    | | 0 | A12 | A4  |    | |
| 0 | A11 | A3  |    | | 1 | A11 | A3  |    | |

FIG. 16

| 0 | BA3 | A10 | A1 | | 0 | BA3 | A10 | A1 | |
|---|-----|-----|----|--|---|-----|-----|----|--|
| 0 | BA2 | A9  | A0 | | 0 | BA2 | A9  | A0 | |
| 1 | BA1 | A8  |    | | 1 | BA1 | A8  |    | |
| 0 | BA0 | A7  |    | | 0 | BA0 | A7  |    | |
| 0 | A14 | A6  |    | | 0 | A14 | A6  |    | |
|   | A13 | A5  |    | | 0 | A13 | A5  |    | |
| 0 | A12 | A4  |    | | 1 | A12 | A4  |    | |
| 0 | A11 | A3  |    | | 0 | A11 | A3  |    | |

FIG. 18

COMMAND FORMAT

|  |  |  |  |  |  |  |  |  |  |
|---|---|---|---|---|---|---|---|---|---|
| 0 | BA3 | A10 | A1 |  |  |  |  |  |  |
| 0 | BA2 | A9 | A0 |  |  |  |  |  |  |
| 1 | BA1 | A8 |  |  |  |  |  |  |  |
| 1 | BA0 | A7 |  |  |  |  |  |  |  |
| 0 | A14 | A6 |  |  |  |  |  |  |  |
|  | A13 | A5 |  |  |  |  |  |  |  |
| 0 | A12 | A4 |  |  |  |  |  |  |  |
| 0 | A11 | A3 |  |  |  |  |  |  |  |

FIG. 19

| D0 | D8 | D16 | D24 | D32 | D40 | D48 | D56 | RFU | RFU |
|---|---|---|---|---|---|---|---|---|---|
| D1 |  |  |  |  |  |  |  | RFU | RFU |
| D2 |  |  |  |  |  |  |  | RFU | RFU |
| D3 |  |  |  |  |  |  |  | RFU | RFU |
| D4 |  |  |  |  |  |  |  | RFU | RFU |
| D5 |  |  |  |  |  |  |  | RFU | RFU |
| D6 |  |  |  |  |  |  |  | RFU | RFU |
| D7 |  |  |  |  |  |  | D63 | RFU | RFU |

FIG. 24A

| CLK_ref | | | | | | | | | |
|---|---|---|---|---|---|---|---|---|---|
| PIN0 | FOP3 | BA3 | A10 | A1 | RFU | BOP3 | BA3 | A10 | A1 | RFU |
| PIN1 | FOP2 | BA2 | A9 | A0 | RFU | BOP2 | BA2 | A9 | A0 | RFU |
| PIN2 | FOP1 | BA1 | A8 | RFU | RFU | BOP1 | BA1 | A8 | RFU | RFU |
| PIN3 | FOP0 | BA0 | A7 | RFU | RFU | BOP0 | BA0 | A7 | RFU | RFU |
| PIN4 | FEXIT | A14 | A6 | RFU | RFU | BEXIT | A14 | A6 | RFU | RFU |
| PIN5 | RFU | A13 | A5 | RFU | RFU | RS2 | A13 | A5 | RFU | RFU |
| PIN6 | CS1 | A12 | A4 | RFU | RFU | RS1 | A12 | A4 | RFU | RFU |
| PIN7 | CS0 | A11 | A3 | RFU | RFU | RS0 | A11 | A3 | RFU | RFU |

FIG. 24B

| CLK_ref | | | | | | | | | | | | | | | |
|---|---|---|---|---|---|---|---|---|---|---|---|---|---|---|---|
| PIN0 | FOP3 | FEXIT | BA3 | A14 | A10 | A6 | A1 | RFU | RFU | B0P3 | BEXIT | BA3 | A14 | A10 | A6 | A1 | RFU |
| PIN1 | FOP2 | RFU | BA2 | A13 | A9 | A5 | A0 | RFU | RFU | B0P2 | RS2 | BA2 | A13 | A9 | A5 | A0 | RFU |
| PIN2 | FOP1 | CS1 | BA1 | A12 | A8 | A4 | RFU | RFU | RFU | B0P1 | RS1 | BA1 | A12 | A8 | A4 | RFU | RFU |
| PIN3 | FOP0 | CS0 | BA0 | A11 | A7 | A3 | RFU | RFU | RFU | B0P0 | RS0 | BA0 | A11 | A7 | A3 | RFU | RFU |

FOREGROUND OPERATION · BACKGROUND OPERATION

FIG. 29

| PIN0 | FOP3 | FOP2 | FOP1 | • | • | • | RFU | RFU | RFU | B0P3 | B0P2 | B0P1 | • | • | • | RFU | RFU |

MEMORY SYSTEM AND METHOD HAVING POINT-TO-POINT LINK

RELATED APPLICATIONS

This nonprovisional application is related to U.S. Provisional Patent Application No. 60/716,587, filed in the U.S. Patent and Trademark Office on Sep. 13, 2005.

This application claims priority to Korean patent application number 2005-0084813, filed in the Korean Intellectual Property Office on Sep. 12, 2005 and Korean patent application number 2005-0087212, filed in the Korean Intellectual Property Office on Sep. 20, 2005.

The contents of all of the above listed applications are incorporated herein in their entirety by reference.

FIELD OF THE INVENTION

The invention described herein relates to memory systems and, in particular, to a memory system having a point-to-point link between memories and a memory system than can perform foreground and background operations simultaneously.

BACKGROUND OF THE INVENTION

FIG. 1 contains a schematic block diagram illustrating a memory module 10, and FIG. 2 contains a schematic block diagram illustrating a memory system 100 that includes a plurality of the memory modules 10 of FIG. 1. Referring to FIG. 1, the memory module 10 includes a plurality of memory devices M1-M8. The eight memory devices M1-M8 are shown sharing a common command/address (CA) signal line 12 connected from a host (not shown). This sharing of the common CA line is referred to as a multi-drop link. Typically, eight or four memory devices share a common CA line.

Each of the memory devices M1-M8 also receives a plurality of parallel data (DQ) signal lines 14. In the memory module of FIG. 1, each of the memory devices receives eight DQ(X8) lines 14. In the conventional memory module 10, each DQ signal line 14 is connected from the host (not shown) to a memory device by a point-to-point link.

As shown in FIG. 2, the conventional memory system 100 includes a plurality of memory modules 210, 220, etc., of the type of memory module 10 shown in FIG. 1. The memory modules 210, 220 are connected to and communicate with a host 200. The memory module 210 includes a plurality of memory devices M11, M12, . . . , M1N, and the memory module 220 includes a plurality of memory devices M21, M22, . . . , M2N. A CA signal line 212 is connected to the memory devices M11, M12, . . . , M1N in memory module 210 by a multi-drop link. A CA signal line 222 is connected to the memory devices M21, M22, . . . , M2N in memory module 220 by another multi-drop link. Multiple parallel DQ signal lines 214-1 are connected by multi-drop links to memory devices M11 and M21. Multiple parallel DQ signal lines 214-2 are connected by multi-drop links to memory devices M12 and M22. Multiple parallel DQ signal lines 214-N are connected by multi-drop links to memory devices M1N and M2N.

Typical high-density memory systems include a plurality of memory modules, as shown in FIG. 2. The DQ signal lines have multi-drop links, so that multiple memory devices M share common DQ lines. The loading of the DQ lines caused by the multi-drop links adversely affects the operation speed of the memory system 100. For example, eight SDRAMs or four double data rate (DDR) memories or two DDR2 or DDR3 memories may be all connected by single DQ lines. It is important to reduce the capacitive loading introduced by the multi-drop links of the CA and DQ lines to improve operational speed of the memory system 100.

SUMMARY OF THE INVENTION

According to the invention, in a high-speed memory system, for example, a memory system operating at or above 2 GHz bps, point-to-point (PTP) links are used of all signal lines, i.e., CA and DQ signal lines, between a memory controller (host) and individual memory devices. The PTP links reduce capacitive loading and stub of each signal line.

For a high-density memory system, a plurality of memory modules are used. Each memory system having a PTP link has input/output module tabs for each signal line. This results in an increase in the number of module tabs in order to accommodate the PTP links. According to the invention, in a high-density memory system supporting the PTP links, the increase in module tabs is avoided by using stacked memory devices or planar memory devices on a single memory module. As a result, the memory system may have only a single memory module. In accordance with the invention, the multiple memory devices on a single memory module have PTP links between them to enable high-speed operation.

According to a first aspect, the invention is directed to a memory system. The memory system includes a controller for generating a control signal; a primary memory for receiving the control signal from the controller; and a secondary memory coupled to the primary memory, the secondary memory being adapted to receive the control signal from the primary memory. The control signal defines a background operation to be performed by one of the primary and secondary memories and a foreground operation to be performed by the other of the primary and secondary memories.

In one embodiment, the background operation is executed by one of the primary and secondary memory while a target output port of the one of the primary and secondary memories is not operating. The background operation can be one of a power-down operation, a precharge operation and a self-refresh operation.

In one embodiment, when one of the foreground operation and background operation is a read operation, data from the secondary memory is received at the controller. The data from the secondary memory can be transferred through the primary memory to the controller.

Each of the primary memory and secondary memory can be a DRAM memory.

A connection between the controller and the primary memory and a connection between the primary and secondary memories can be a differential connection or a single-ended connection.

The primary memory and the secondary memory can be linked by a point-to-point link.

According to another aspect, the invention is directed to a memory system having a controller; a primary memory coupled to the controller, such that signals can be transferred between the primary memory and the controller using a first signal transfer protocol; and a secondary memory coupled to the primary memory, such that signals can be transferred between the primary memory and secondary memory using a second signal transfer protocol, the first and second signal transfer protocols being different.

In one embodiment, the first signal transfer protocol transfers a first quantity of bits substantially simultaneously, and the second signal transfer protocol transfers a second quantity of bits substantially simultaneously, the first and second quantities being different.

In one embodiment, the second signal transfer protocol is an at least partially serialized version of the first signal transfer protocol.

Each of the primary memory and secondary memory can be a DRAM memory.

A connection between the controller and the primary memory and a connection between the primary and secondary memories can be a differential connection or a single-ended connection.

The primary memory and the secondary memory can be linked by a point-to-point link.

According to another aspect, the invention is directed to a memory system comprising: a controller for generating a control signal; a primary memory for receiving the control signal from the controller; a secondary memory coupled to the primary memory, the primary memory and the secondary memory being linked by a point-to-point link; and a cache memory coupled to the primary memory, the cache memory being adapted to store information from the secondary memory.

The cache memory can be internal to the primary memory and/or the secondary memory.

Each of the primary memory and secondary memory can be a DRAM memory.

A connection between the controller and the primary memory and a connection between the primary and secondary memories can be a differential connection or a single-ended connection.

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention. In the drawings, the thickness of layers and regions are exaggerated for clarity.

FIG. 11 contains a table of definitions of the value of the CS0-CS1 field according to an embodiment of the invention.

FIG. 12 contains a table of definitions of the value of the RS0-RS2 field according to an embodiment of the invention.

FIG. 13 contains tables identifying foreground and background operations in accordance with embodiments of the invention.

FIG. 16 contains a table illustrating another example of a C/A packet command according to an embodiment of the invention.

FIG. 18 contains a table illustrating a command packet format for a memory write command according to the invention.

FIG. 19 contains a table illustrating the format of a data packet the would follow the write command packet of FIG. 18 in accordance with the invention.

FIGS. 24A and 24B contain tables indicating the format of an example WR/CA signal serialized according to one embodiment of the invention.

FIG. 29 contains a table illustrating the serialized command packet applicable to the memory systems of FIGS. 27 and 28.

DETAILED DESCRIPTION OF PREFERRED EMBODIMENTS OF THE INVENTION

Figure 1:
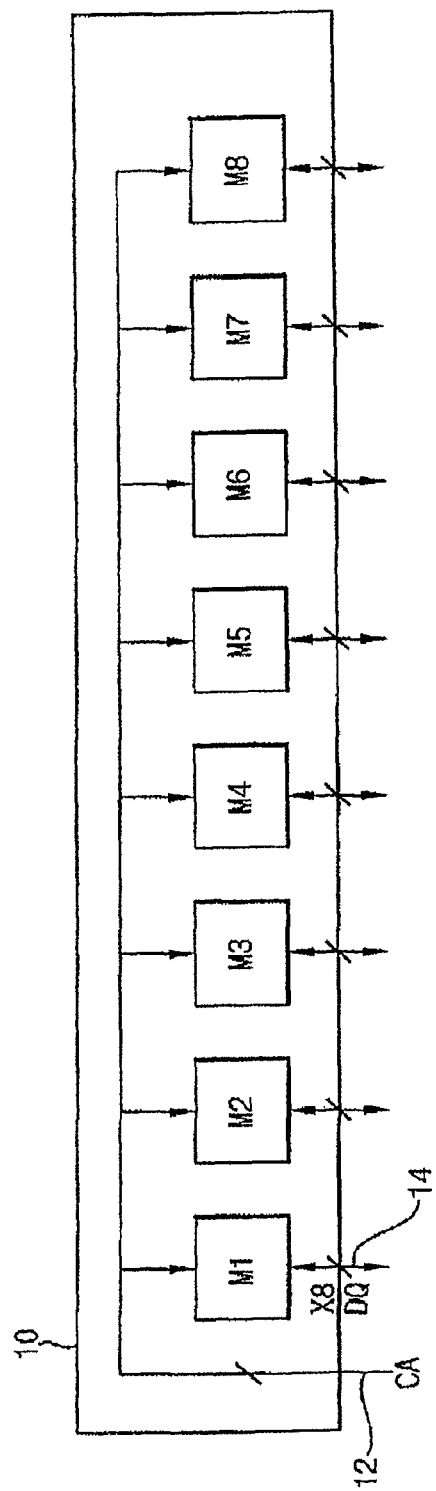
FIG. 1 contains a schematic block diagram illustrating a conventional memory module.
Figure 2:
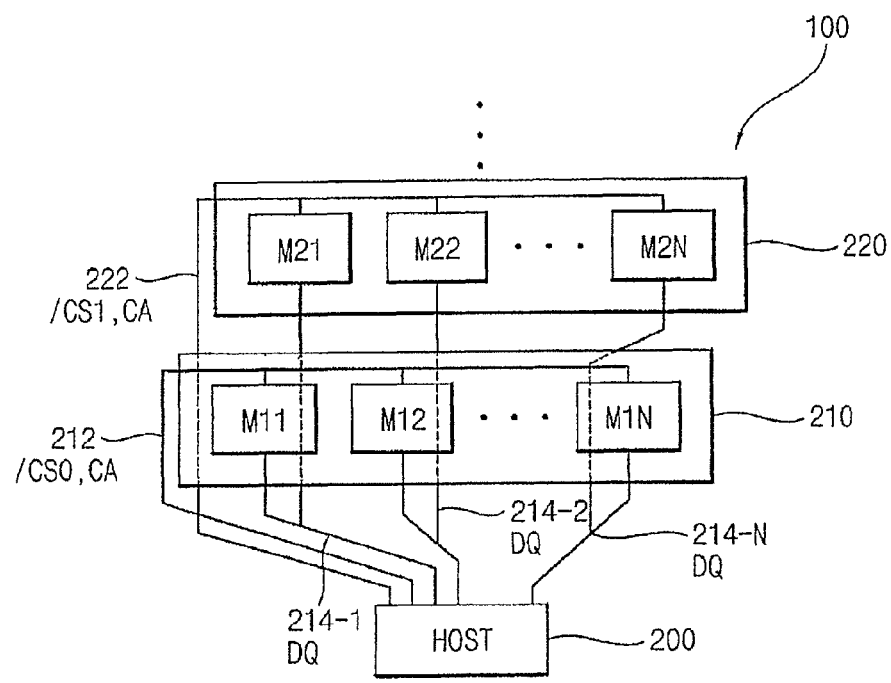
FIG. 2 contains a schematic block diagram illustrating a conventional memory system that includes a plurality of the memory modules of FIG. 1.
Figure 3A:
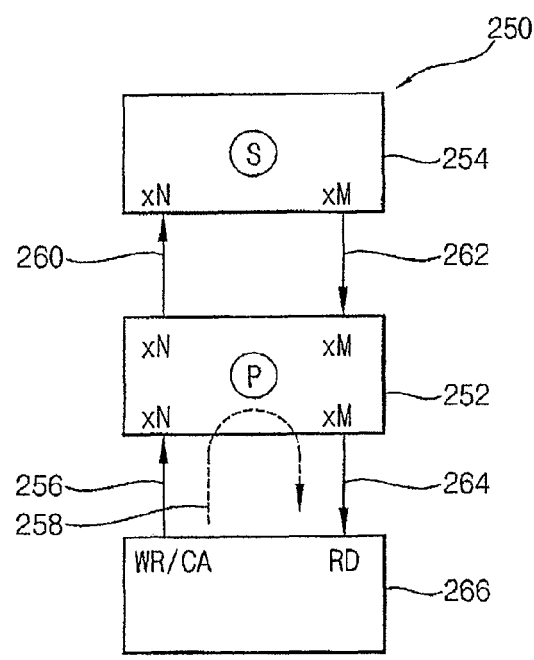
FIGS. 3A-3C are schematic diagrams functionally illustrating a memory system 250 having a PTP link architecture.
Figures 3B, 3C:
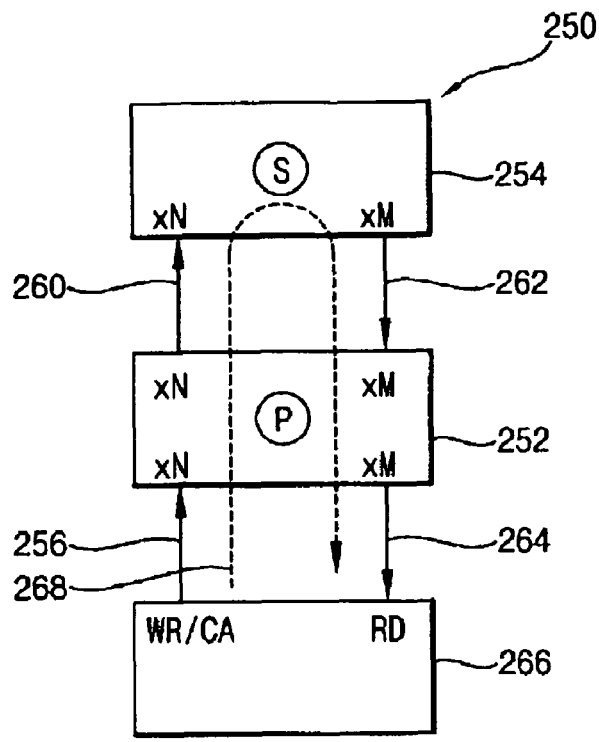

FIGS. 3A-3C are schematic diagrams functionally illustrating a memory system 250 having a PTP link architecture. The memory system of FIGS. 3A and 3B includes a primary memory device 252 and a secondary memory device 254. A host or controller 266 sends and receives commands and data to and from the primary 252 and secondary 254 memories while executing program instructions.

The controller 266 includes a write/CA (WR/CA) port through which write data and CA signals can be transferred to the memory devices 252 and 254. The controller 266 also includes a read (RD) port through which data read from the memory devices 252 and 254 are received by the controller 266.

The primary memory device 252 includes four ports. A first receive port labeled "xN" can include N pins and receives WR/CA signals from the controller 266 on lines 256. A first transmit port labeled "xN" can include N pins and transmits WR/CA signals to the secondary memory 254 along lines 260. A second receive port of the primary memory 252 labeled "xM" can include M pins and receives read data from the secondary memory 254 along lines 262. A second transmit port of the primary memory 252 labeled "xM" can include M pins and transmits read data to the controller 266 along lines 264.

The secondary memory device 254 includes two ports. A receive port labeled "xN" can include N pins and receives WR/CA signals from the primary memory 252 along lines 260. A transmit port labeled "xM" can include M pins and transmits read data to the primary memory 252 along lines 262.

FIG. 3A schematically illustrates the case in which the primary memory device 252 is accessed by the controller 266. The dashed line 258 illustrates the flow of signals including read commands and read data from the primary memory through the system 250. FIG. 3B illustrates the case in which the secondary memory device 254 is accessed by the controller 266. The dashed line 268 illustrates the flow of signals including read commands and read data from the secondary memory through the system 250. FIG. 3C is a table illustrating operation of the memory system 250 of FIGS. 3A and 3B in the cases in which the primary memory device 252 and secondary memory device 254 are accessed by the controller 266. As shown in FIGS. 3A and 3C, when a primary memory Write/Read is performed, the secondary memory state is "stand-by," that is, the secondary memory 254 does not perform any operation when the controller 266 accesses the primary memory 252. When the primary memory Write/Read is performed, the primary memory 252 is in an active state, that is, the primary memory is active to perform the requested operation. As shown in of FIGS. 3B and 3C, when a secondary memory Write/Read is performed, the secondary memory state is active to perform the requested operation. During the secondary memory Write/Read, the primary memory 252 is in a "transfer" state, meaning that the primary memory 252 only repeats (transfers) WR/CA information to the secondary memory 254 along lines 260 and repeats or relays read data from the secondary memory 254 to the controller 266 along lines 264. The efficiency and bus utilization of the memory system 250 using this conventional approach illustrated in FIGS. 3A-3C are low because only one memory device having a PTP link can operate in response to a single command issued to either of the primary and secondary memory devices.

This inefficiency is eliminated using the approach of the invention. According to the invention, when the memory controller reads/writes from/to one of the memories composing the PTP link, the other memory simultaneously performs certain operations that will not affect the memory bus connected to/from the controller. Two simultaneous operations are possible using a packet protocol that identifies two operations, referred to herein as a first operation or "foreground" operation and a second operation or "background" operation. The invention thus provides a memory system and method with improved efficiency using a PTP link architecture.

According to certain embodiments of the invention, the input/output (IO) protocol and interface link between the memory controller and the primary memory is different from that between memory devices. Specifically, in these embodiments, all memories, with the exception of the primary memory, have a serial interface so that signal routing between memories can be easier, and package size can be smaller that the package size where a conventional PTP link is used.

According to certain embodiments of the invention, the primary memory can include an internal cache buffer for saving read data that is expected to be accessed by the controller more frequently from the secondary memory. In accordance with these embodiments, since the primary memory is accessed more frequently than the secondary memory, a cache buffer is located in the primary DRAM. Some frequently accessed contents of the secondary DRAM is preselected and prelocated in the cache buffer. This results in improved system throughput.

Figure 4:
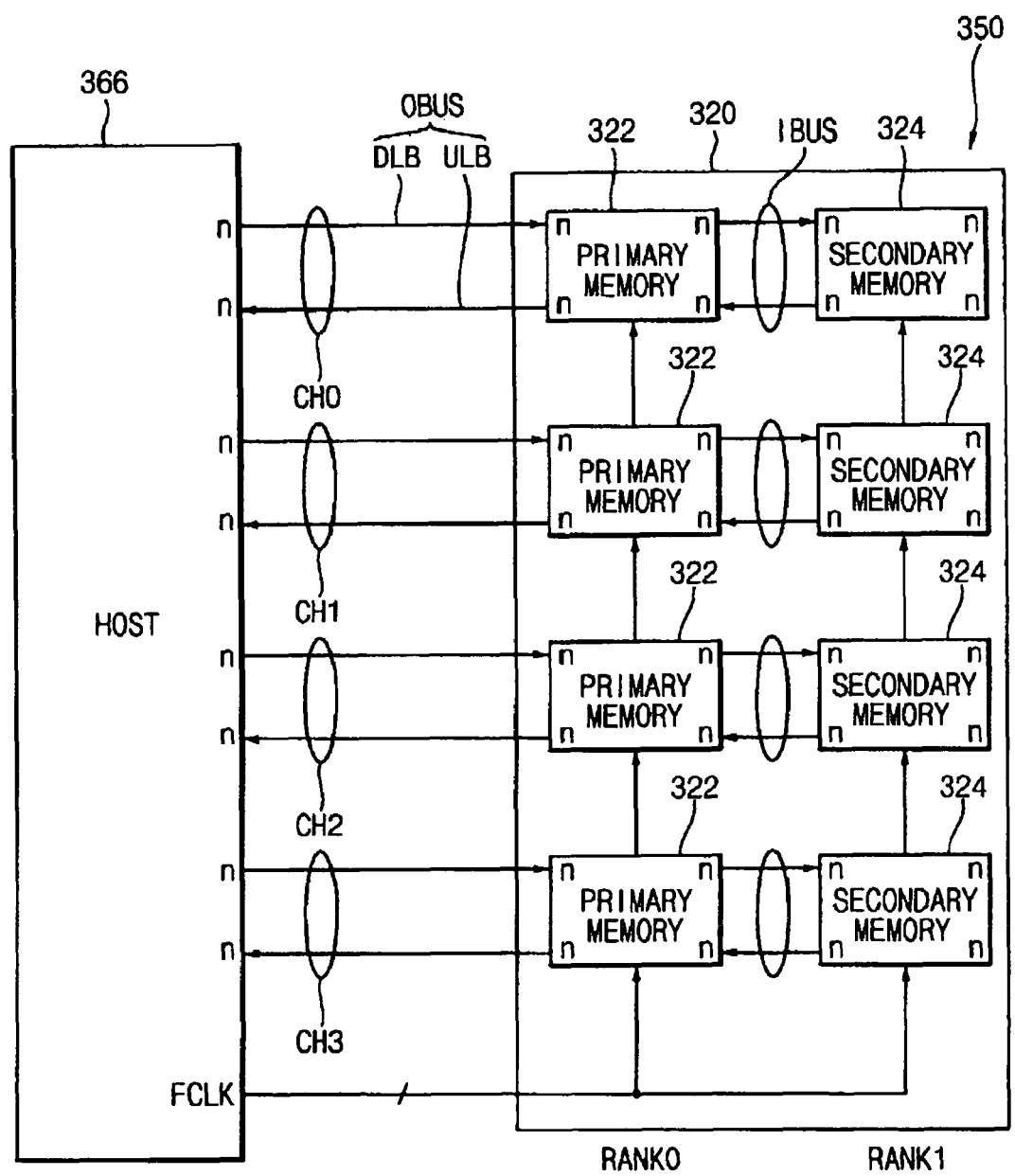
FIG. 4 is a schematic block diagram illustrating an embodiment of a memory system in accordance with the invention.

FIG. 4 is a schematic block diagram illustrating an embodiment of a memory system 350 in accordance with the invention. The memory system 350 of FIG. 4 includes a memory module 320 and a memory controller or host 366 for transferring signals and data to and from the memory module 320. The host 366 is connected to the memory module 320 through four channels CH0-CH3 of an outer bus OBUS. The outer bus OBUS includes a download bus (DLB) which transfers command signals, address signals, a write clock signal and/or a write data signal. The outer bus OBUS also includes an upload bus (ULB) which transfers read data and read clock signals. On the outer bus OBUS, all signals are transferred unidirectionally by way of a PTP link.

The memory module 320 includes primary (P) memories 322 and secondary (S) memories 324 for each of the channels CH0-CH3. The primary memories 322 are connected directly to the host 366 through the outer bus OBUS. The secondary memories 324 are connected to respective primary memories 322 through an inner bus IBUS. The primary memories 322 are referred to as RANK0 memories, and the secondary memories are referred to as RANK1 memories. A reference clock CLK_Ref is provided to each memory device 322, 324.

Figure 5:
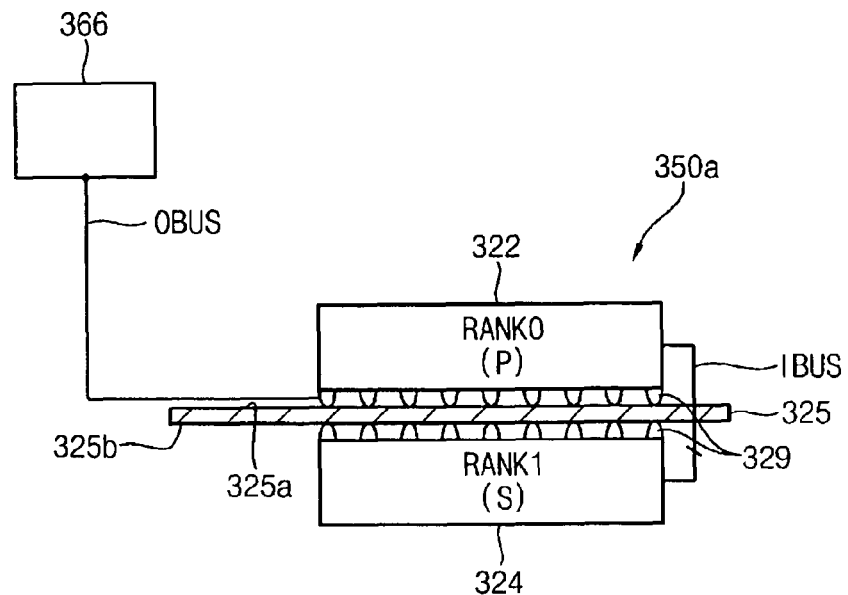
FIGS. 5-7 contain schematic block diagrams of three configurations of the memory system of FIG. 4, according to embodiments of the invention.
Figure 6:
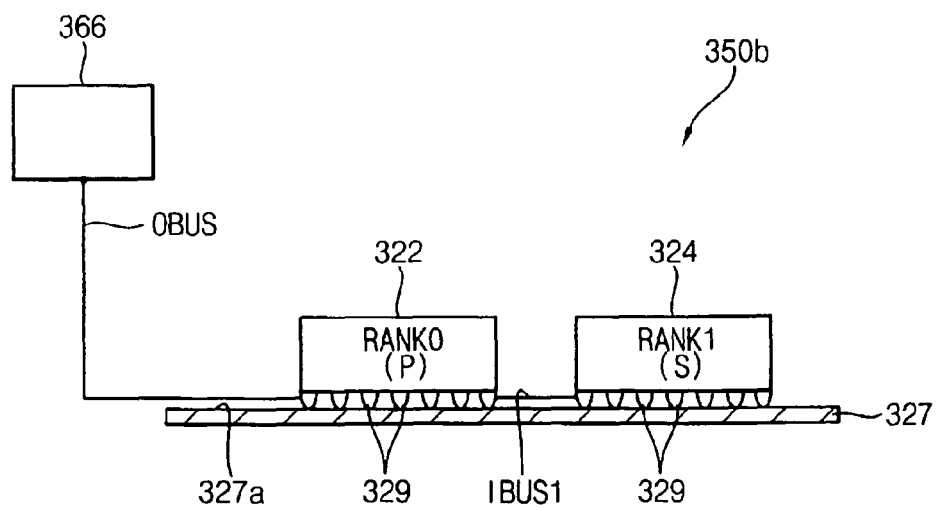
Figure 7:
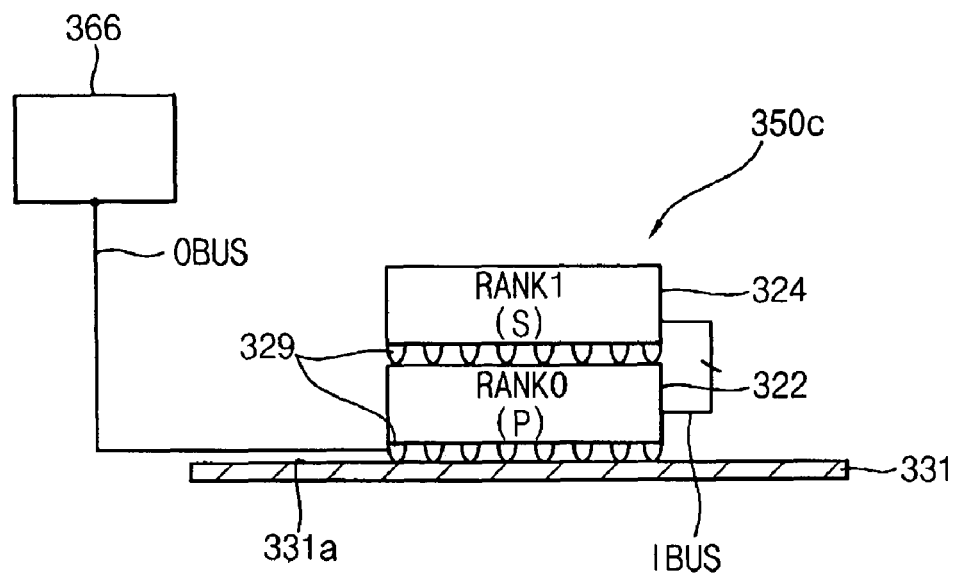

FIGS. 5-7 contain schematic block diagrams of three configurations of the memory system 350 of FIG. 4, according to embodiments of the invention. Referring to FIG. 5, the memory system 350a includes a primary (P) memory 322 connected on a top side 325a of a printed circuit board or mother board 325 and a secondary (S) memory 324 connected on a bottom side 325b of the printed circuit or mother board 325. The memories 322 and 324 are connected to the mother board 325 via a plurality of conductive pins or bumps 329. The primary memory 322 is connected to the secondary memory 324 by the conductive pins or bumps 329, which carry the IBUS. The primary memory 322 is connected to the host 366 by the OBUS.

Referring to FIG. 6, the memory system 350b includes a primary (P) memory 322 and a secondary (S) memory 324 connected on a top side 327a of a printed circuit board or mother board 327. The memories 322 and 324 are connected to the mother board 327 via a plurality of conductive pins or bumps 329. The primary memory 322 is connected to the secondary memory 324 by the IBUS. The primary memory 322 is connected to the host 366 by the OBUS.

Referring to FIG. 7, the memory system 350c includes a primary (P) memory 322 and a secondary (S) memory 324 connected to one side 331a of a printed circuit board or mother board 331. The primary memory 322 is directly connected to the printed circuit or mother board 331 via a plurality of conductive pins or bumps 329. The secondary memory 324 is stacked on top of the primary memory 322 and is connected to the printed circuit or mother board 331 via the primary memory 322 through a plurality of conductive pins or bumps 329. Alternatively, the primary memory 322 and secondary memory can be two separate dies integrated into a single package connected to the printed circuit or mother board 331. The primary memory 322 is connected to the secondary memory 324 by the conductive pins or bumps 329 which carry the IBUS. The primary memory 322 is connected to the host 366 by the OBUS.

Figure 8A:
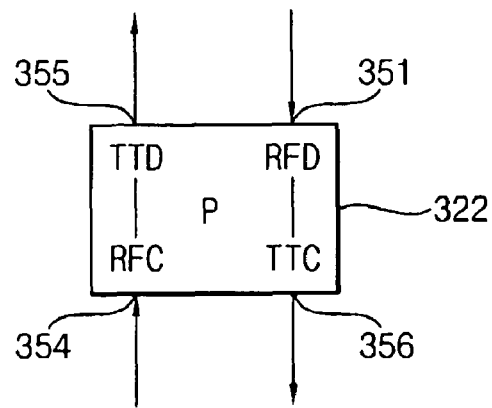
FIG. 8A is a schematic block diagram of a primary (P) memory in accordance with an embodiment of the invention.
Figure 8B:
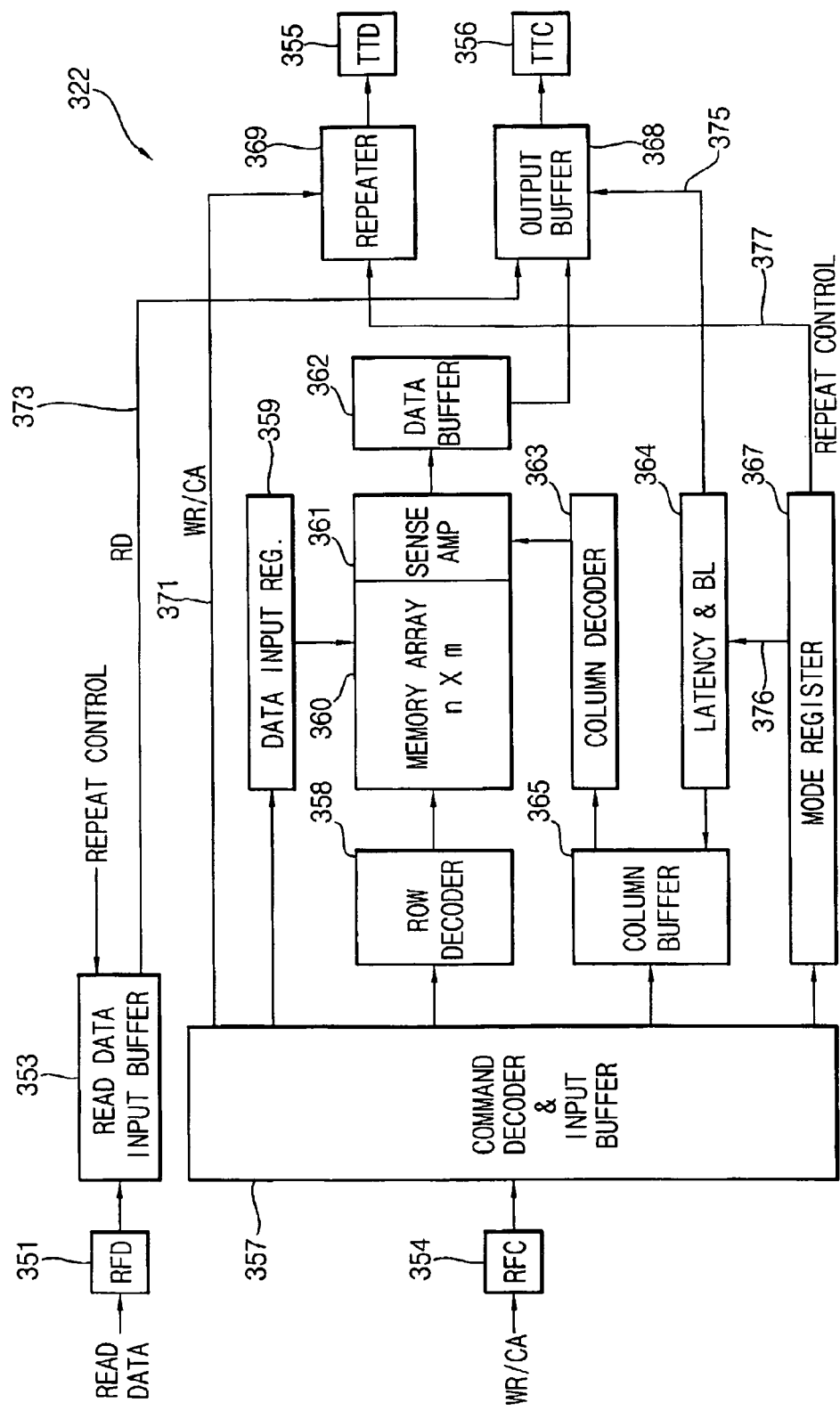
FIG. 8B is a detailed schematic block diagram of internal circuitry of the primary memory of FIG. 8A.

FIG. 8A is a schematic block diagram of a primary (P) memory 322 in accordance with an embodiment of the invention. FIG. 8B is a detailed schematic block diagram of internal circuitry of the primary memory 322 of FIG. 8A. Referring to FIG. 8A, the primary memory 322 includes four input/output ports for transmitting and receiving commands and data to and from the controller and the secondary memory 324. The port 354 labeled RFC is a receiving port from the controller, which receives signals including commands and write data from the host or controller 366. The port 351 labeled RFD is a receiving port from memory, which receives signals such as read data signals from another memory such as the secondary memory 324. The port 355 labeled TTD is a transmitting port to memory, which transmits signals to another memory such as the secondary memory 324. The port 356 labeled TTC is the transmitting port to controller, which transmits signals including read data to the controller or host 366.

Referring to FIG. 8B, the memory 322 includes circuitry used to implement the invention as well as conventional circuitry used in memory devices. The memory 322 includes a nxm memory array 360 connected to a sense amplifier 361. The sense amplifier 362 is connected to a data buffer 362, which is connected in turn to an output buffer 368. A row decoder 358 and column decoder 363 are used in conventional fashion to decode memory addresses in the memory array 360. Data out of the memory array is sensed by the sense amplifier 361 and transferred through the data buffer 362 to the output buffer 368, which passes the data out of the memory 322 via the TTC port 356. The command decoder and input buffer 357 receives WR/CA signals from the host 366 via the RFC port 354. Commands are decoded by the command decoder and input buffer 357. The memory 322 also repeats the commands and write data from controller to the secondary memory 324 thorough the TTD port via the repeater 369.

For primary memory access commands, the command decoder and input buffer 357 transfer address information to the row decoder 358 and column buffer 365. The column buffer 365, column decoder 363 and row decoder 358 decode the address information and access the memory array 360 in conventional fashion. In the case of a write process, input data is received by the data input register 359 from the command decoder and input buffer 357 and is passed to the address memory array 360. In the case of a read process, data is read from the memory array 360 and is passed from the sense amplifier 361 through the data buffer 362, to the output buffer 368 and out of the memory 322 through the TTC port 356.

For processes in which commands are to be repeated to the secondary memory 324, WR/CA signals are received at the command decoder and input buffer 357 via the RFC port 354. The WR/CA signals are output from the command decoder and input buffer 357 along lines 371 to the repeater circuit 369. Also, for repeating read data from the secondary memory in the primary memory, read data are received at the RFD port, then read data are sent to the output buffer thorough the read data input buffer. As a result, the read data from the secondary memory is transferred to the controller via TTC port. A repeat control signal is transferred on line 377 from the mode register 367 to the repeated 369 and also to the read data input buffer 353.

As part of this repeating process, a mode register can be set by a MRS (Mode Register Set) operation to decide whether the repeater and the read data input buffer are enabled. If a memory device is used as the primary memory, the repeater and the read data input buffer is enabled by the repeat control signal outputted from the mode register. If a memory device is used as the secondary memory, the repeater and the read data input buffer is not enabled by the repeat control signal outputted from the mode register. Alternatively, for the repeating process, the repeater and the read data input buffer can be controlled by identification information which indicates the location of the memory in PTP link structure.

In the case in which read data from a secondary memory access is being passed through or relayed by the primary memory 322, the read data is received from the secondary memory 324 at the RFD port 351. A read data input buffer 353 transfers the read data RD on lines 373 to the output buffer 368.

FIGS. 8A and 8B illustrate a memory device that can be one of primary memory and secondary memory by the MRS operation which decides the enabling the repeater and the read data input buffer for repeating WR/CA and read data, respectively. Also, If the memory is used as primary memory, WR/CA is always repeated regardless of decoding the WR/CA. That is, the primary memory receives the WR/CA and repeats it to the secondary memory not after decoding the WR/CA/)

Figures 9, 10:
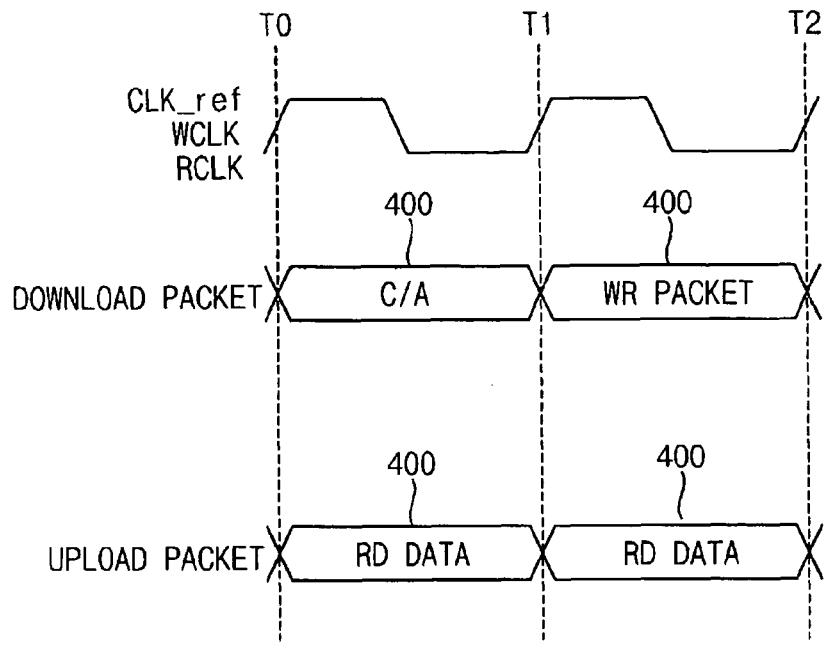
FIG. 9 contains a timing diagram illustrating processing of a download packet and an upload packet according to an embodiment of the invention.
FIG. 10 contains a schematic illustration of a download C/A packet in accordance with an embodiment of the invention.

FIG. 9 contains a timing diagram illustrating processing of a download packet and an upload packet according to an embodiment of the invention. The download packet may be a packet including commands and write data from the host to the primary memory or to secondary memory. The upload packet may be a packet including read data from the primary memory or the secondary memory to the host. The download packet includes two unit packets, including C/A signals or C/A signals and write data WR when the command being executed indicates a write operation. The upload packet includes two read data RD unit packets. The size of the unit packet is determined by how many bits can be included in one period of the CLK_ref signal. The write clock WCLK is used to control the timing of the processing of the download packet, and the read clock RCLK is used to control the timing of the processing of the upload packet.

FIG. 10 contains a schematic illustration of a download C/A packet in accordance with an embodiment of the invention. According to the invention, the download C/A packet includes a first command to be executed by one of the primary and secondary memories and a second command to be simultaneously executed by the other of the primary and secondary memories. The first command is referred to herein as a foreground command and the second command is referred to herein as a background command. This terminology does not suggest any kind of hierarchy, priority or categorization of the commands. The selected nomenclature, i.e., foreground and background, is used for ease and clarity of description.

FIG. 10 contains a schematic illustration of a C/A download packet including a foreground operation and a background operation according to an embodiment of the invention. In this particular illustration, eight ten-bit words are transferred on eight pins Pin0 through Pin7. The bits B1-B5 are for the foreground operation, and the bits B6-B10 are for the background operation. The bits for the foreground operation are transferred during the first half cycle of the reference clock CLK_ref, and the bits for the background operation are transferred during the second half cycle of the reference clock CLK_ref.

Referring to FIG. 10, the bits B1 of pins Pin0-Pin3 define a four-bit field FOP3-FOP0 which identifies the foreground operation to be performed. The bits B6 of pins Pin0-Pin3 define a four-bit field BOP3-BOP0 which identifies the background operation to be performed. The foreground operations defined by the field FOP3-FOP0, and the background operation defined by the field BOP3-BOP0 are identified in FIG. 13, which contains tables identifying foreground and background operations in accordance with embodiments of the invention. It should be noted from FIG. 13 that a cache enable command is included as one of the foreground commands. The cache enable command refers to the use of a cache memory being included in the primary memory. It will be described in further detail hereinbelow.

Bit B1 of Pin4 identifies a foreground FEXIT command, and bit B6 of Pin4 identifies a background BEXIT command. These commands are of the type that do not involve read or write memory access. In a FEXIT or BEXIT command, when the bit is active, the memory exits its previous power down or self-refresh state.

Bit B1 of pins Pin6 and Pin7 define a two-bit field CS0-CS1 used to identify which memory rank, e.g., primary or one of a plurality of secondary memories, is to execute the foreground operation. FIG. 11 contains a table of definitions of the value of the CS0-CS1 field according to an embodiment of the invention.

Bit B6 of pins Pin5-Pin7 define a three-bit field RS0-RS2 used to identify which memory rank is to execute the background operation. FIG. 12 contains a table of definitions of the value of the RS0-RS2 field according to an embodiment of the invention.

Referring again to FIG. 10, the remaining bits are used to define memory addresses A0-A14 and B0-B4 for memory access commands. It should be noted that the term "RFU" used herein means reserved for future use.

Figures 14, 15:
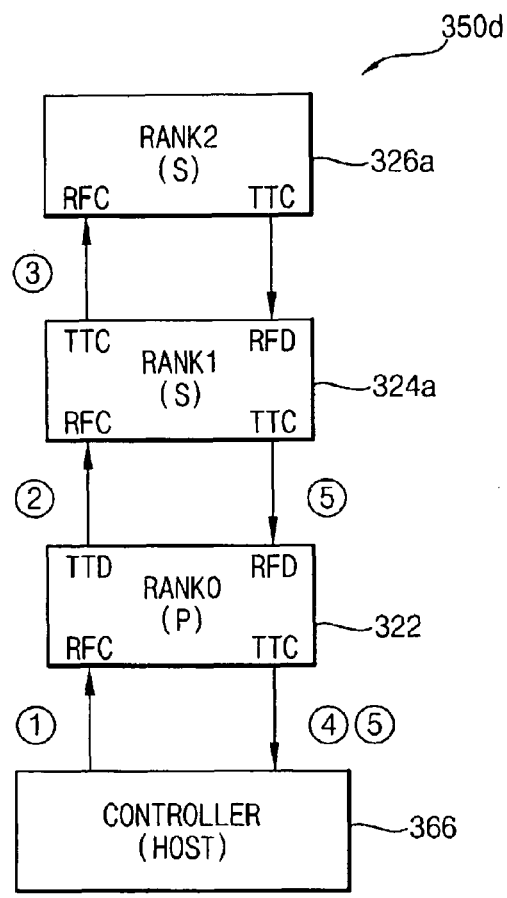
FIG. 14 contains a schematic block diagram of a memory system in accordance with an embodiment of the invention.
FIG. 15 contains a table illustrating an example of a C/A packet command according to an embodiment of the invention.

FIG. 14 contains a schematic block diagram of a memory system 350d in accordance with an embodiment of the invention. The general memory system of 350 includes a primary memory 322, referred to as RANK 0, connected to the controller or host 366. A first secondary memory 324a is connected to the primary memory 322, and a second secondary memory 324b is connected to the first secondary memory 324a. This embodiment of the invention illustrates that the invention is applicable to a memory system having a primary memory 322 at RANK 0 and any number of secondary memories 324 at RANKs 1, 2, 3, . . . .

FIG. 15 contains a table illustrating an example of a C/A packet command according to an embodiment of the invention. Referring to FIGS. 10, 11, 12, 13, 14 and 15, the command of FIG. 15 illustrates the example case in which a read of the Rank 1 memory 324a is performed while a power down of the other two ranks, i.e., the Rank 0 memory 322 and the Rank 2 memory 326a, is performed. The CS0/CS1 field, having the value 10, indicates that the Rank 1 memory 324a is to perform a foreground operation. The RS0/1/2 field, having the value 101, indicates that the Rank 0 memory 322 and the Rank 2 memory 326a are to perform background operations. The FOP0-FOP3 field, having a value of 0100, indicates that the foreground operation performed by the Rank 1 memory 324a is a READ operation. The BOP0-BOP3 field, having a value of 0001, indicates that the background operation performed by the Rank 0 memory 322 and the Rank 2 memory 326a is a power-down operation.

When the Rank 0 memory 322 receives the C/A packet command, it decodes CS0/CS1 and RS0/1/2 fields to determine whether it should react by executing the foreground operation or background operation. This case is for the Rank 0 memory 322 background operation, and the Rank 0 memory 322 enters into a power-down mode. Also, the Rank 0 memory repeats the packet command to the Rank 1 memory 324a.

When the Rank 1 memory 324a receives the C/A packet command from the Rank 0 memory 322, it decodes the CS0/CS1 and RS0/1/2 fields determine whether it should react as executing the foreground operation or the background operation. This case is for the Rank 1 memory 324a foreground operation and, and the Rank 1 memory 324a reads out its memory cell data as designated by the address information in the C/A packet command. The Rank 1 memory 324a also repeats the C/A packet command to the Rank 2 memory 326a. When the Rank 2 memory 326a receives the command packet, it responds in the same fashion as the Rank 0 memory 322 responded, except that it does not repeat the C/A packet command, because it is at the top rank of the memories.

After a CAS latency of approximately 10 ns, the Rank 1 memory 324a outputs read data to the Rank 0 memory. It should be noted that even if Rank 0 is at power-down, its receiving port RFD and transmit or driver port TTC for the repeater is still turned on to transfer the read data to the controller 366.

FIG. 16 contains a table illustrating another example of a C/A packet command according to an embodiment of the invention. The command of FIG. 16 illustrates the example case in which a read of Rank 0 and Rank 1 are performed successively with a single command packet. In this example case, Rank 0 receives the packet command and decodes the CS0/CS1 and RS0/1/2 fields to determine if it is to perform a background or foreground operation. This case is for a Rank 0 foreground operation, and Rank 0 reads out the appropriate read data R0 using the foreground operation address information. It also repeats the packet command to Rank 1.

When Rank 1 receives the command packet from Rank 0, it decodes the CS0/CS1 and RS0/1/2 fields and determines whether it is to execute a foreground operation or background operation. In this case, Rank 1 is to perform a background operation, and it reads out the appropriate memory cell read data R1 as designated by the background operation addresses. It also repeats the command packet to Rank 2.

Rank 2 does not respond to the command packet because the CS0/CS1 and RS0/1/2 fields do not identify Rank 2. After a CAS latency of approximately 10 ns, Rank 1 outputs the read data R1 to Rank 0. After two times the repeater delay, the memory data is transferred to the controller 366.

Figure 17:
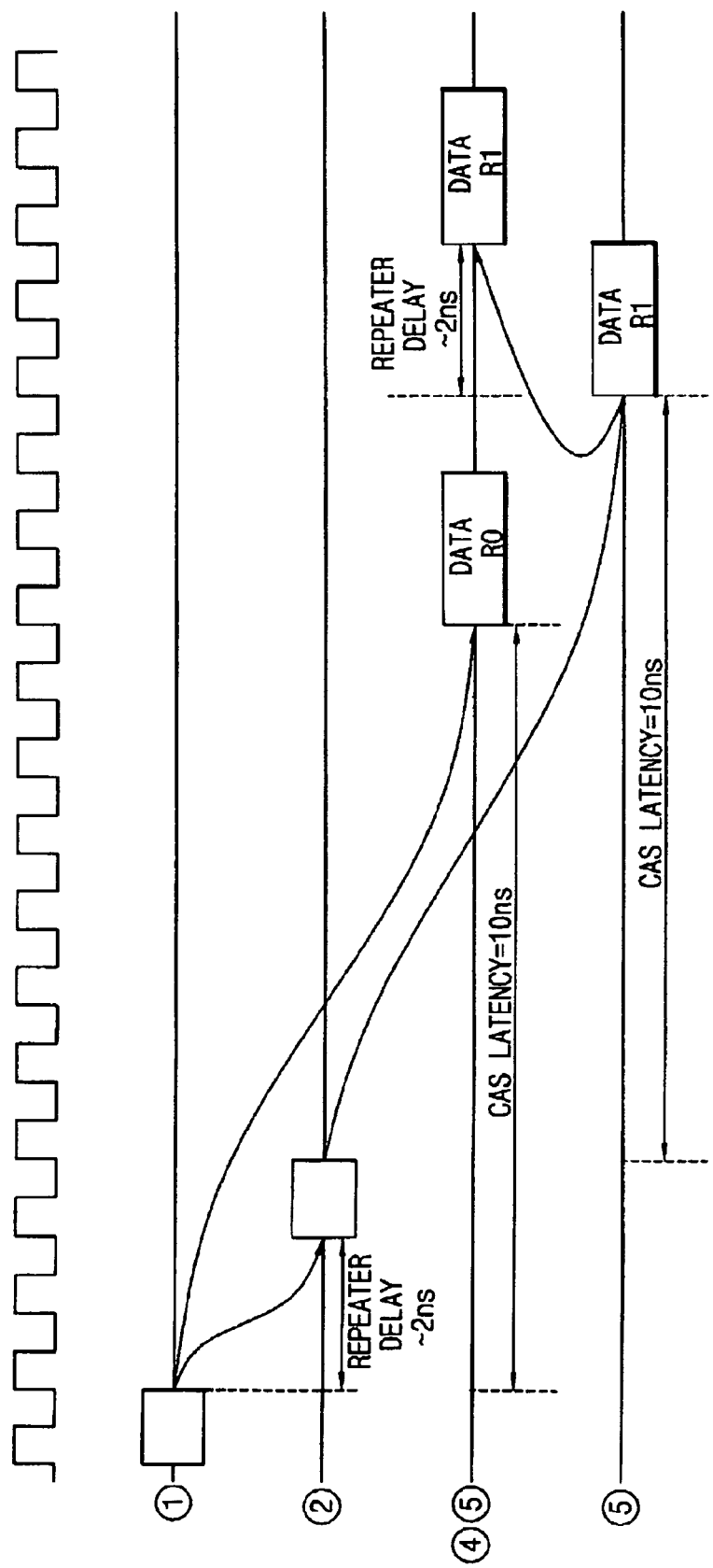
FIG. 17 contains a timing diagram illustrating the operations of the example command execution described in connection with FIG. 16.

FIG. 17 contains a timing diagram illustrating the operations of the example command execution described immediately above in connection with FIG. 16. It is noted that the numbers 1-5 in circles in the timing diagram of FIG. 17 correspond to the same numbers labeled on the block diagram of the memory system 350d in FIG. 14. Referring to FIGS. 14 and 17, it is shown that the controller 366 receives the R0 and R1 data successively from the primary memory. Thus, for a single command, both the primary and secondary memories are accessed.

FIG. 18 contains a table illustrating a command packet format for a memory write command according to the invention. FIG. 19 contains a table illustrating the format of a data packet that would follow the write command packet of FIG. 18 in accordance with the invention. Referring to FIG. 18, it is noted that the write command does not have a background operation in this embodiment. The memory identified by the FOP field is accessed for writing the designated data. Referring to FIG. 19, the data packet format assumes 64 bits of data written at a single cycle of the clock. The data packet of FIG. 19 can follow immediately after the write command packet of FIG. 18.

Figure 20:
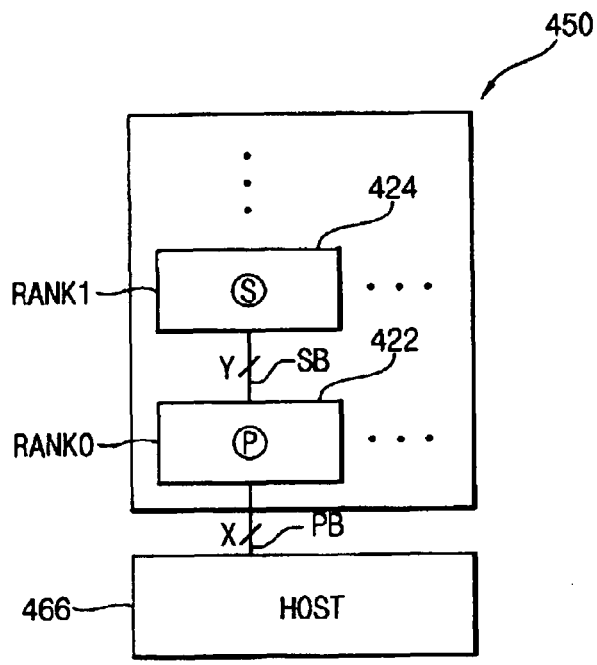
FIGS. 20-22 contain schematic block diagrams of a memory system in accordance with another embodiment of the invention.
Figure 21:
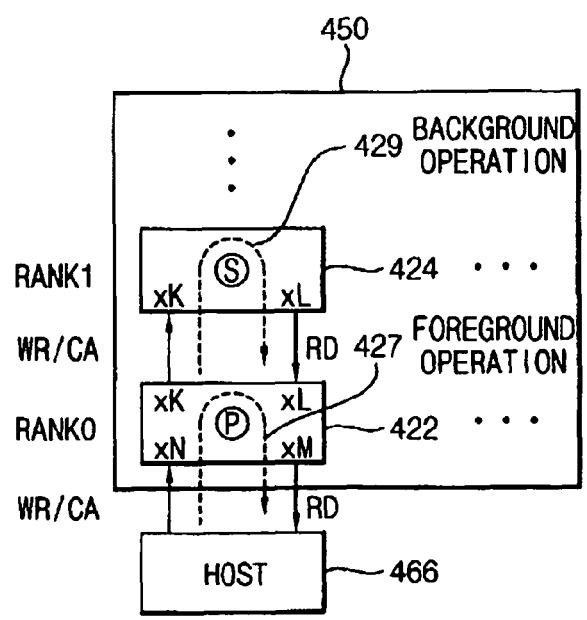
Figure 22:
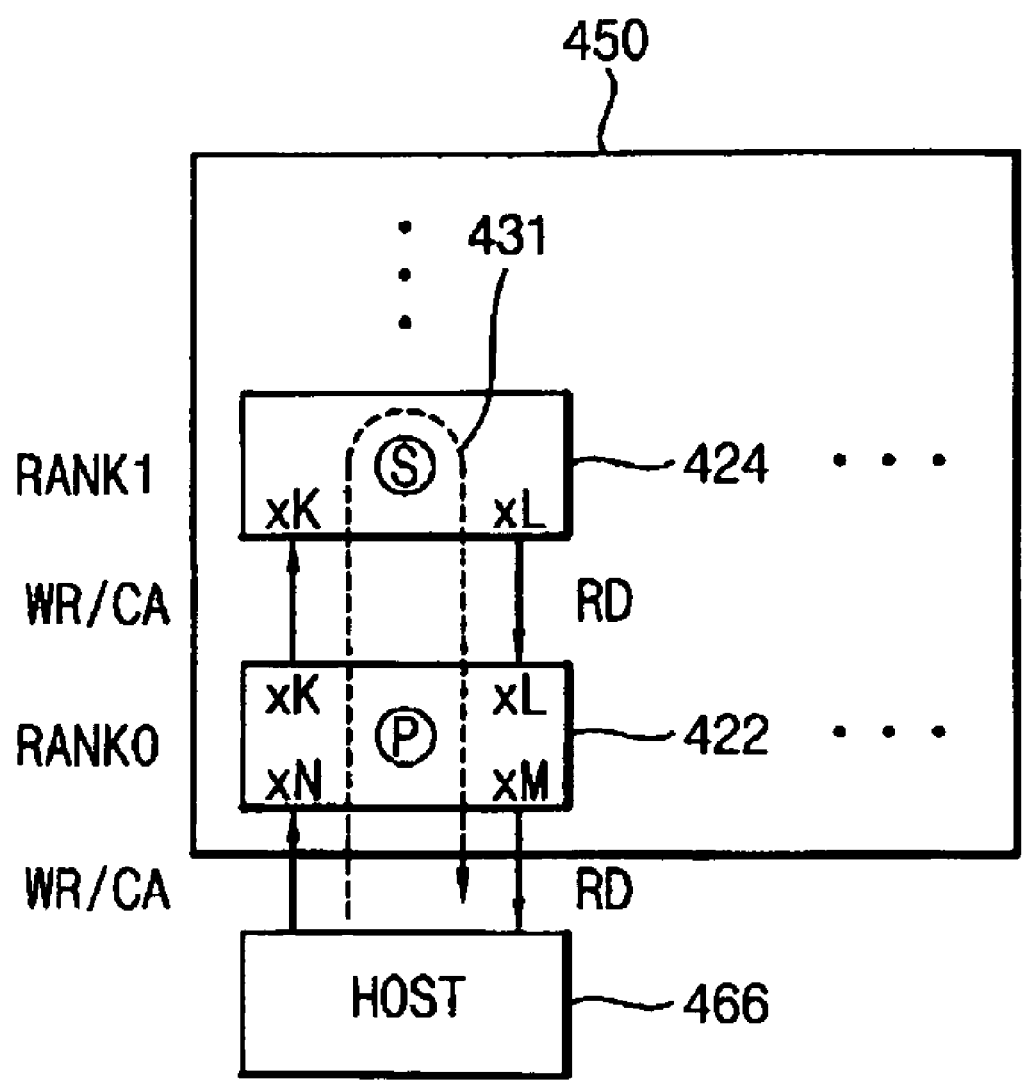

FIGS. 20-22 contain schematic block diagrams of a memory system 450 in accordance with another embodiment of the invention. The system 450 of FIGS. 20-22 includes a primary (P) memory 422 connected to a host or controller 466 and one or more secondary (S) memories 424 connected to the primary memory 422. In this embodiment, the interface and protocol between the host 466 and the primary memory 422 is different than that between the primary and secondary memories. Specifically, the interface between the Rank 0 primary memory 422 and the Rank 1 secondary memory 424 is a serialized link SB. In contrast, the link between the host 466 and the primary memory 422 is a parallel link (PB). As shown in FIG. 20, the link PB can include a number X lines and the link SB between the memories can include a number Y lines, where X and Y are different. That is, X can be N or M lines, and Y can be K or L lines. These numbers of lines are shown in the diagrams of FIGS. 21 and 22. For example, N=8, M=8, K=4, and L=4. In this embodiment, the memories other than the primary memory can have fewer pins than the primary memory. This can minimize the difficulty in signal routing between memories and also can avoid increasing package size of more secondary memories. In addition, the serial link between memories provides more signal integrity by minimizing noise sources between adjacent signals. That is, cross-talk between the signal lines is reduced.

The foregoing description of embodiments of the invention also applies to the embodiment shown in FIGS. 20-22. That is, the use of execution of foreground and background operations in multiple memories initiated by a single command is applicable to the embodiment of FIGS. 20-22. For example, as shown in FIG. 21, a foreground operation can be executed by the primary memory 422 (dashed line 427) while a background operation can be executed by the secondary memory 424 (dashed line 429). As shown in FIG. 22, for example, a foreground or background operation can be executed by the secondary memory 424 (dashed line 431)

Figure 23:
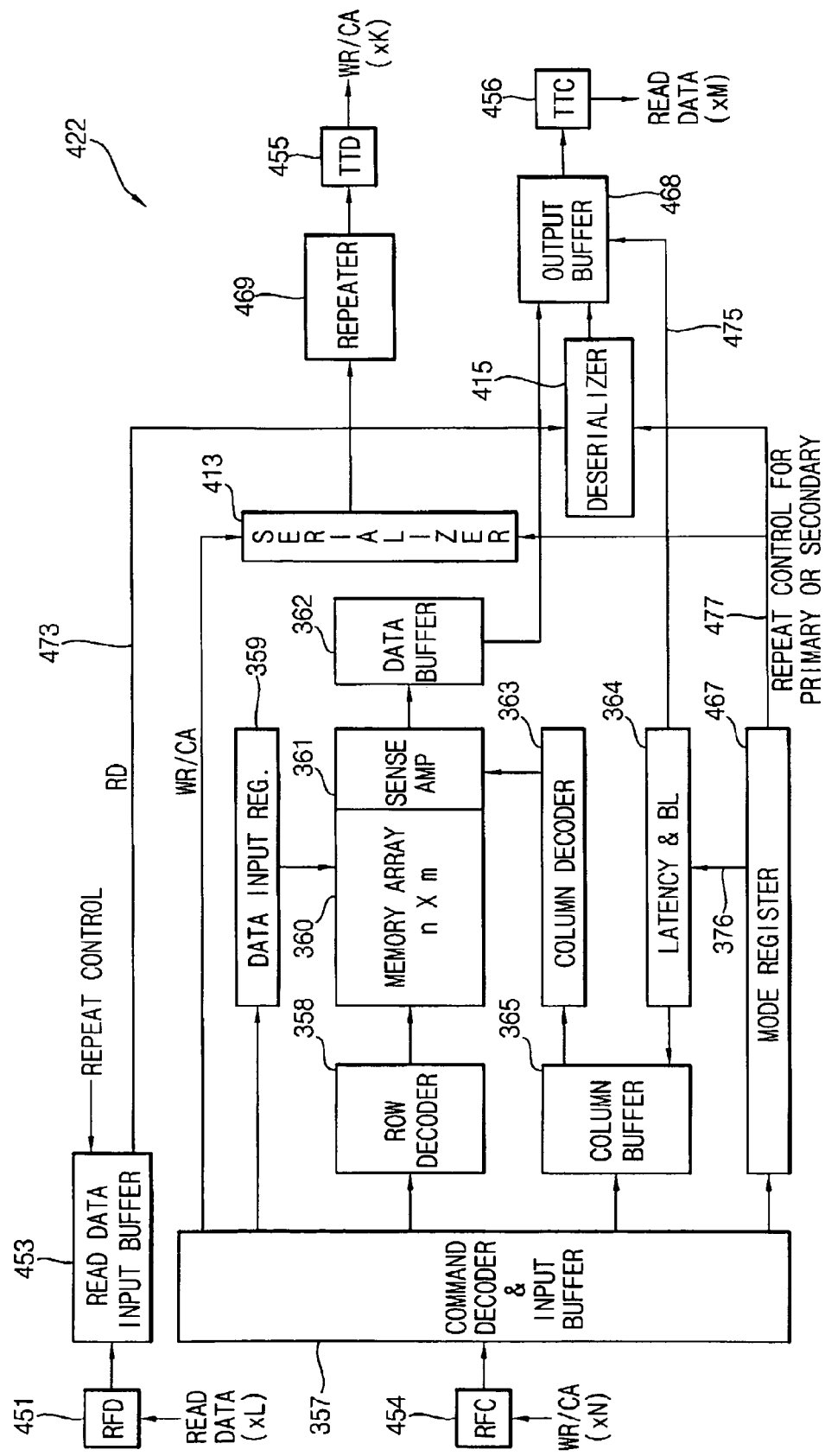
FIG. 23 is a schematic block diagram of a primary memory shown in FIGS. 20-22, according to an embodiment of the invention.

FIG. 23 is a schematic block diagram of a primary memory 422 shown in FIGS. 20-22, according to an embodiment of the invention. Elements of the block diagram of FIG. 23 that are functionally similar to those of FIG. 8B are labeled with like reference numerals. Detailed description of these elements will not be repeated.

The block diagram of FIG. 23 includes the serializer circuit 413 for repeating WR/CA signals to the secondary memory and the deserializer circuit 415 for repeating read data from the secondary memory to the host 466.

Read data (xL) is received by the read port RFD 451 and is passed to the read data input buffer 453, which transfers the read data RD on lines 473 to the deserializer 415. The deserializer 415 deserializes the read data and passes the deserialized read data to the output buffer 468 under the control of the repeat control signal from the mode register 467, which is passed to the deserializer 415 on lines 477. The output buffer 468 selects the deserialized read data from the deserializer 415 for transfer out of the memory 422 through the TTC port 456 as xM data under the control of the control signal from the latency and BL circuit 364 on line 475.

WR/CA signals are received at the RFC port 454 in xN format. The WR/CA signals are decoded by the command decoder and input buffer 357. When the WR/CA signals are to be repeated to the secondary memory, the mode register 467 is set appropriately to set the repeat control signal on line 477 to the appropriate value. The WR/CA signal is passed to the serializer 413 where it is serialized. The serializer then passes the serialized WR/CA signals to the repeater 469 under the control of the repeat control signal 477. The repeater passes the serialized WR/CA signals to the TTD port which transfers the serialized WR/CA signals in xK format to the secondary memory. By way of example, in this illustrative embodiment, N=8, K=4, L=4, and M=8.

The serializer 413 and repeater 469 for repeating the WR/CA and the deseriallizer 415 for repeating the read data is enabled by the MRS operation according to the location of the PTP link structure. If the memory is used as a memory other than the top of the PTP link structure, the serilalizer 413 and repeater 469 and the deserializer 415 is enabled by the repeat control signal outputted from the mode register. If the memory is used as top of the PTP link structure, the serializer 413 and repeater 469 and the deserializer 415 is not enabled by the repeat control signal. The repeat control signal is also applied to the read data input buffer 453.

FIGS. 24A and 24B contain tables indicating the format of an example WR/CA signal serialized according to one embodiment of the invention. In this example embodiment, an 8-bit WR//CA signal is partially serialized to a 4-bit signal. FIG. 24A shows the format of the original WR/CA signal. As indicated, the entire eight bits are transferred during a single period of the clock signal CLK_ref. FIG. 24B shows the format of the serialized version of the WR/CA signal. As indicated, the serialized signal is four bits wide, instead of the original eight bits. The serialized version of the signal is transferred in two periods of the clock signal CLK_ref. This serialized packet is repeated to the secondary memory as described above.

FIGS. 25-28 contain schematic block diagrams of various embodiments of memory systems in which the serialization and background and foreground operations of the invention are applied. In these embodiments, only the primary memory repeats WR/CA signals. That is, the secondary memories do not have a repeat function, so that the secondary memories can be less complex. This is accomplished by the primary memory performing multiple serializations of the WR/CA command and transferring each serialized version to the appropriate secondary memory directly. The secondary memories also do not repeat read data to each other. Rather, they each forward their respective read data directly to the primary memory, which then repeats the read data to the host.

Figure 25:
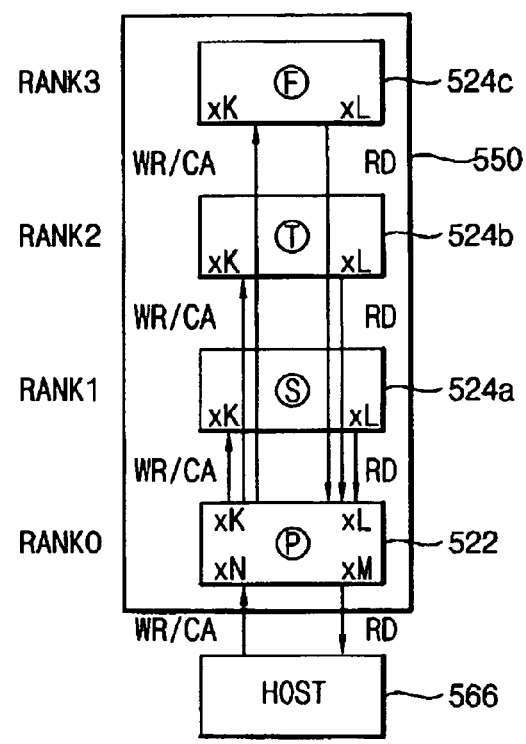
FIGS. 25-28 contain schematic block diagrams of various embodiments of memory systems in which the serialization and background and foreground operations of the invention are applied.

Referring to FIG. 25, in the memory system 550, the host 566 transmits the WR/CA packet to the primary memory 522 in a xN format. The primary memory creates, in this example, three serialized WR/CA packets and transfers them directly to their associated secondary memories 524a, 524b and 524c. The transmit port by which the primary memory 522 transmits the signals can have a 3×K format. For example, K may be 2. In that case, with three secondary memories, for the secondary memories receiving the serialized signals, K may be 2. Also, each of the secondary memories 524a, 524b and 524c transfers its respective read data directly to the primary memory in xL format.

Figure 26:
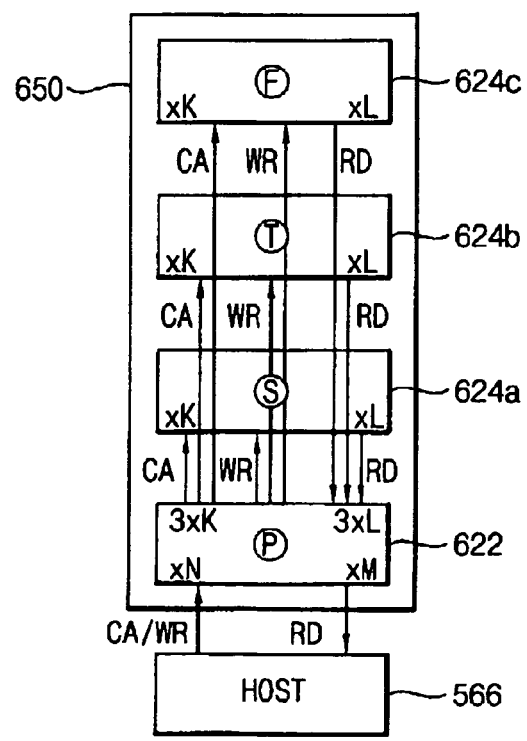

Referring to FIG. 26, the memory system 650 includes a host 666, a primary memory 622 and secondary memories 624a, 624b and 624c. In the memory system 650 of FIG. 26, separate C/A and WR buses are used, instead of the combined WR/CA bus described thus far. As in the embodiment of FIG. 26, in this embodiment, the primary memory 622 produces multiple serialized C/A and WR from the WR/CA packet and transmits them directly to the appropriate secondary memory 624a, 624b and 624c. The secondary memories transmit their read data directly to the primary memory 622.

Figure 27:
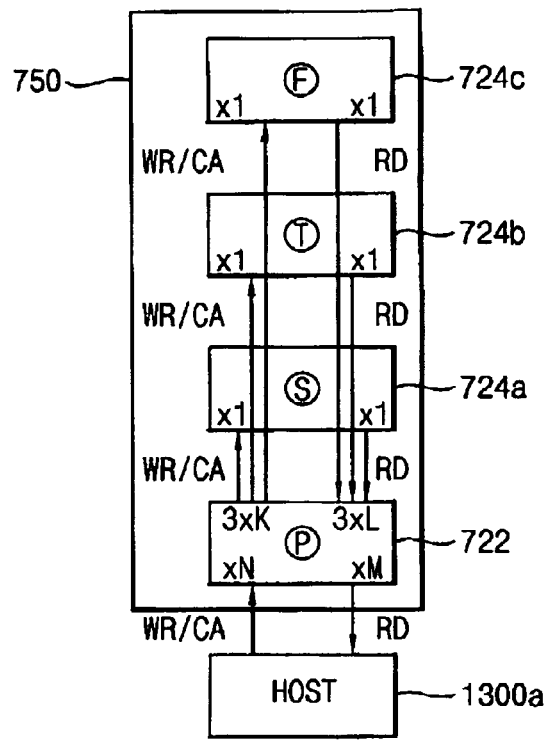
Figure 28:
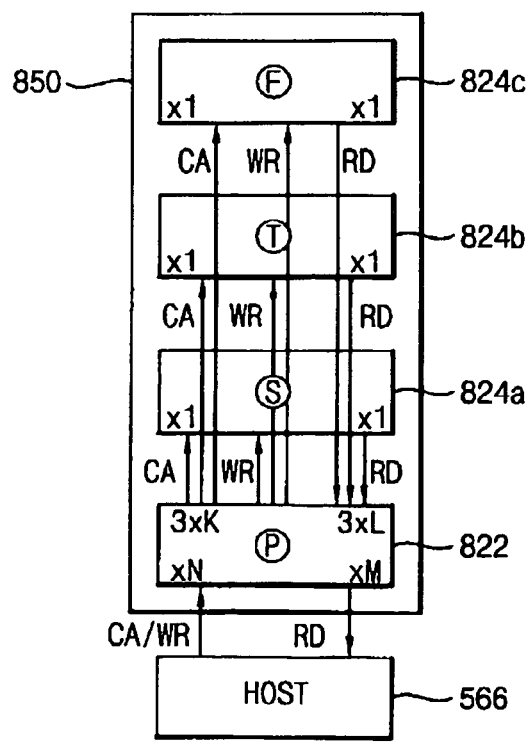

FIGS. 27 and 28 are analogous to FIGS. 25 and 26, respectively, except that, in FIGS. 27 and 28, the serialization performed by the primary memory produces serialized packets of one bit in width. This configuration substantially reduces cross-talk among the serialized signals, makes signal line routing simpler, reduces the amount of space occupied by the system and its components, and reduces the amount of I/O to reduce power dissipation. FIG. 29 contains a table illustrating the serialized command packet applicable to the memory systems 750 and 850 of FIGS. 27 and 28.

Figure 30:
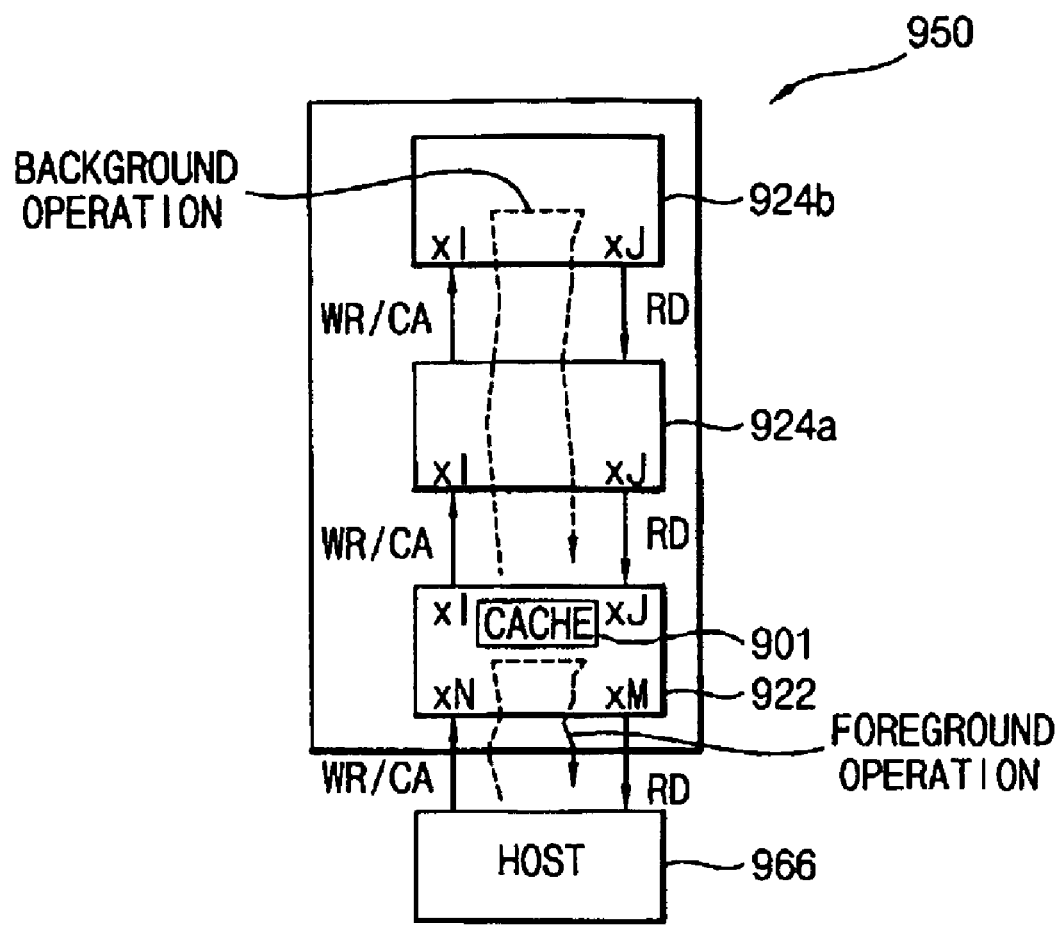
FIG. 30 contains a schematic block diagram of a memory system according to another embodiment of the present invention.

FIG. 30 contains a schematic block diagram of a memory system 950 according to another embodiment of the present invention. In this embodiment, the primary memory 922 includes an on-board, integrated cache memory or buffer 901. All of the embodiments of the invention described herein are applicable to this embodiment of the invention. In this embodiment, information from the secondary memories 924a and 924b can be prestored in the cache buffer 901. This reduces the number of access made by the host 966 to the secondary memories 924a and 924b. In one embodiment, data that is frequently required from one or more of the secondary memories can be loaded into the cache buffer 901 by a background read operation to the secondary memory holding the required data. As a result of storing the data in the cache buffer 901, the throughput of the memory system can be increased.

Figure 31:
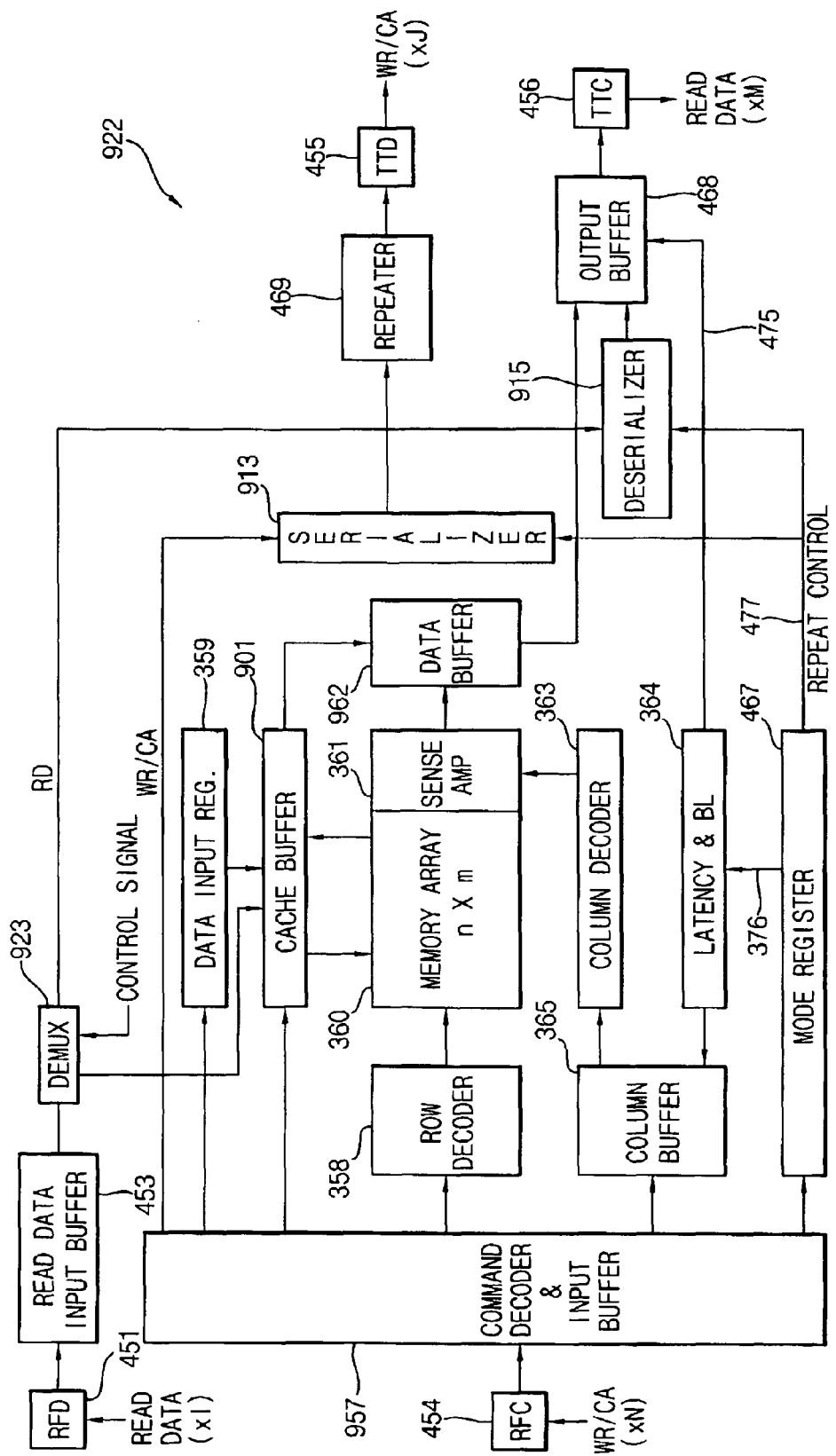
FIG. 31 is a schematic block diagram of a primary memory shown in FIG. 30, according to an embodiment of the invention.

FIG. 31 is a schematic block diagram of a primary memory 922 shown in FIG. 30, according to an embodiment of the invention. Elements of the block diagram of FIG. 31 that are functionally similar to those of FIGS. 8B and 23 are labeled with like reference numerals. Detailed description of these elements will not be repeated.

The block diagram of FIG. 31 includes the cache buffer 901 for saving read data from the secondary memory 924a and 924b as well as the serializer 913 and deserializer 915. If the command decoder and input buffer 957 decodes a foreground operation FOP field (see FIG. 13) as a cache enable (1110), then the decoder 957 outputs a control signal to the DEMUX 923. In response, the DEMUX 923 sends read data from the secondary memory 924a, 924b to the cache buffer 901.

Figure 32:
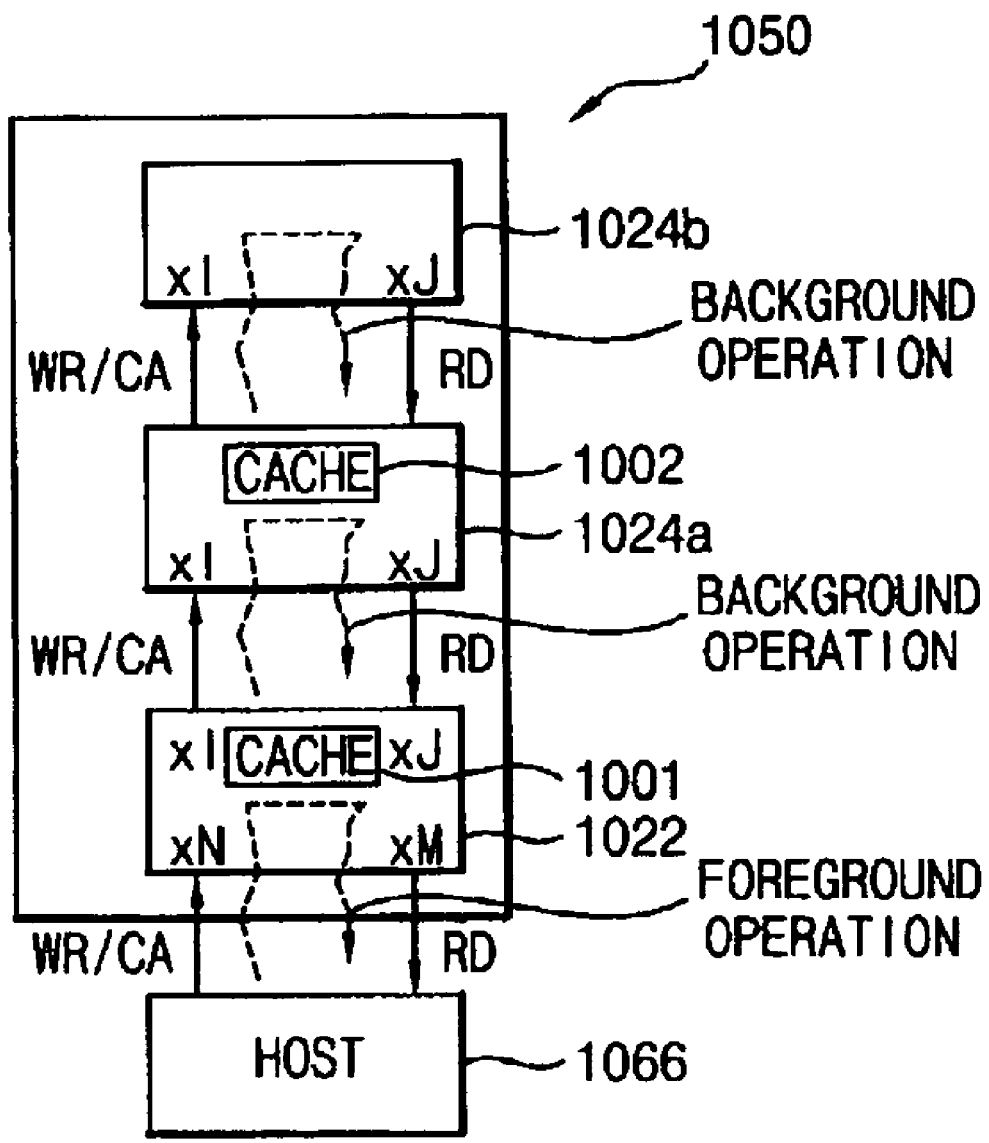
FIG. 32 contains a schematic block diagram of a memory system in which both the primary memory and a secondary memory include a cache buffer, according to another embodiment of the invention.

FIG. 32 contains a schematic block diagram of a memory system in which both the primary memory and a secondary memory include a cache buffer, according to another embodiment of the invention. As shown, in this embodiment, the primary memory 1022 includes a cache buffer 1001, and the secondary memory 1024a includes a cache buffer 1002. Either or both of the cache buffers 1001, 1002 can be used to store data from other memories. Once again, this approach substantially increases the throughput of the system 1050. It should be noted that any or all of the secondary memories 1024a, 1024b, . . . , can include a cache buffer within the scope of this embodiment.

Figure 33:
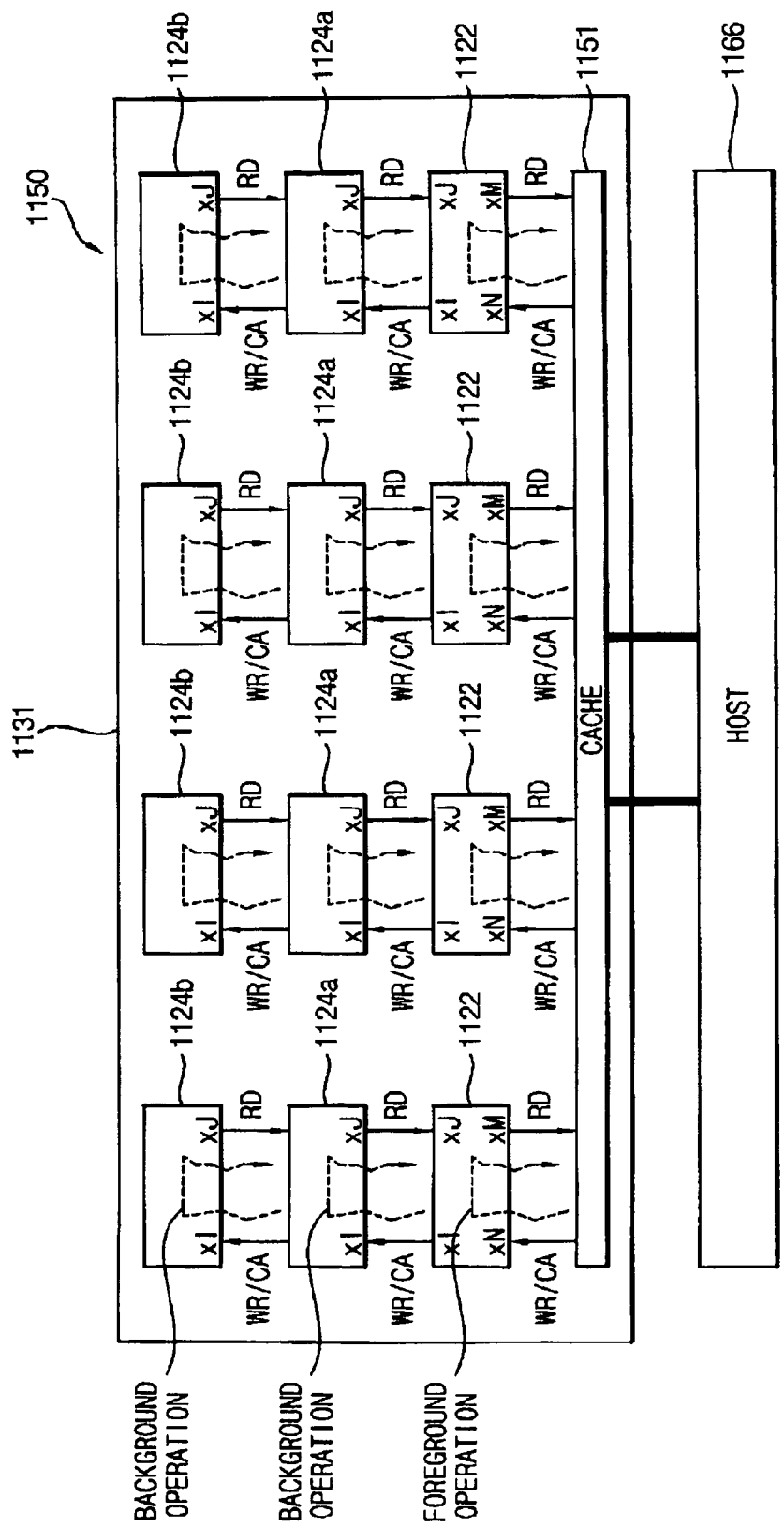
FIG. 33 is a schematic block diagram illustrating a memory system according to another embodiment of the invention.

FIG. 33 is a schematic block diagram illustrating a memory system according to another embodiment of the invention. The description above regarding other embodiments of the invention applies to this embodiment as well as appropriate and without contradiction. The configuration of the memories is of any of the configurations described herein. In this embodiment, the memory system 1150 includes a memory module which includes the primary 1122 and secondary 1124 memories and a cache memory 1151 having a cache buffer. All packets are transferred to the memories from the host 1166 through the cache 1151. Data that is frequently required by the controller 1166 can be loaded into the cache on the foreground and background read operation. Thus, the throughput in this memory system 1151 is greatly improved.

It should be noted that throughout this description, the memory devices referred to can be DRAM memory devices. Also, all connections between memories can be differential or single-ended connections.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A memory system, comprising:
   a controller for generating a control signal; and
   a memory module, the memory module comprising:
      a primary memory, directly coupled to the controller external to the memory module, for receiving the control signal from the controller using a first signal transfer protocol; and
      a secondary memory coupled to the primary memory, the secondary memory being adapted to receive the control signal from the primary memory using a second signal transfer protocol, and communicating with the controller through the primary memory; wherein:
   the control signal defines a background operation to be performed by one of the primary and secondary memories and a foreground operation to be simultaneously performed by the other of the primary and secondary memories, wherein the control signal comprises a packet that includes a first command that is executed by the primary memory to perform the one of the background operation and the foreground operation and a second command that is executed by the secondary memory to simultaneously perform the other of the background operation and the foreground operation, and
   the first and second signal transfer protocols are different, wherein the first signal transfer protocol transfers a first quantity of bits substantially simultaneously, and the second signal transfer protocol transfers a second quantity of bits substantially simultaneously, and wherein the first quantity of bits are transferred by the first signal transfer protocol between the primary memory and the controller, and the second quantity of bits are transferred by the second signal transfer protocol between the primary memory and the secondary memory in a same clock cycle, wherein the second signal transfer protocol is an at least partially serialized version of the first signal transfer protocol.

2. The memory system of claim 1, wherein the background operation is executed by one of the primary and secondary memories while a target output port of the one of the primary and secondary memories is not operating.

3. The memory system of claim 2, wherein the background operation is one of a power-down operation, a precharge operation and a self-refresh operation.

4. The memory system of claim 3, wherein the data from the secondary memory is transferred through the primary memory to the controller.

5. The memory system of claim 1, wherein when one of the foreground operation and background operation is a read operation, data from the secondary memory is received at the controller.

6. The memory system of claim 1, wherein the primary memory is a DRAM memory.

7. The memory system of claim 1, wherein the secondary memory is a DRAM memory.

8. The memory system of claim 1, wherein a connection between the controller and the primary memory is a differential connection.

9. The memory system of claim 1, wherein a connection between the controller and the primary memory is a single-ended connection.

10. The memory system of claim 1, wherein a connection between the primary memory and the secondary memory is a differential connection.

11. The memory system of claim 1, wherein a connection between the primary memory and the secondary memory is a single-ended connection.

12. The memory system of claim 1, wherein the primary memory and the secondary memory are linked by a point-to-point link.

13. A memory system, comprising:
a controller;
a primary memory coupled to the controller, such that signals can be transferred between the primary memory and the controller using a first signal transfer protocol; and
a secondary memory coupled to the primary memory, such that signals can be transferred between the primary memory and secondary memory using a second signal transfer protocol, the first and second signal transfer protocols being different, wherein the first signal transfer protocol transfers a first quantity of bits substantially simultaneously, and the second signal transfer protocol transfers a second quantity of bits substantially simultaneously, and wherein the first quantity of bits are transferred by the first signal transfer protocol between the primary memory and the controller and the second quantity of bits are transferred by the second signal transfer protocol between the primary memory and the secondary memory in a same clock cycle, wherein the second signal transfer protocol is an at least partially serialized version of the first signal transfer protocol.

14. The memory system of claim 13, wherein the first and second quantities are different.

15. The memory system of claim 13, wherein the primary memory is a DRAM memory.

16. The memory system of claim 13, wherein the secondary memory is a DRAM memory.

17. The memory system of claim 13, wherein a connection between the controller and the primary memory is a differential connection.

18. The memory system of claim 13, wherein a connection between the controller and the primary memory is a single-ended connection.

19. The memory system of claim 13, wherein a connection between the primary memory and the secondary memory is a differential connection.

20. The memory system of claim 13, wherein a connection between the primary memory and the secondary memory is a single-ended connection.

21. The memory system of claim 13, wherein the primary memory and the secondary memory are linked by a point-to-point link.

22. A memory system, comprising:
a controller for generating a control signal;
a memory module, the memory module comprising:
a primary memory, directly coupled to the controller external to the memory module, for receiving the control signal from the controller using a first signal transfer protocol; and
a secondary memory coupled to the primary memory, the primary memory and the secondary memory being linked by a point-to-point link, the secondary memory communicating with the controller through the primary memory using a second signal transfer protocol, the memory system further comprising:
a cache memory coupled between the primary memory and the controller, the cache memory being adapted to store information from the secondary memory, wherein the control signal defines an operation for the secondary memory, and wherein the information is stored in the cache memory by the operation defined by the control signal,
wherein the first and second signal transfer protocols are different, wherein the first signal transfer protocol transfers a first quantity of bits substantially simultaneously, and the second signal transfer protocol transfers a second quantity of bits substantially simultaneously, and wherein the first quantity of bits are transferred by the first signal transfer protocol between the primary memory and the controller, and the second quantity of bits are transferred by the second signal transfer protocol between the primary memory and the secondary memory in a same clock cycle, wherein the second signal transfer protocol is an at least partially serialized version of the first signal transfer protocol.

23. The memory system of claim 22, wherein the cache memory is internal to the primary memory.

24. The memory system of claim 22, wherein the cache memory is external to the primary memory.

25. The memory system of claim 22, wherein the cache memory is internal to the secondary memory.

26. The memory system of claim 22, wherein the cache memory is external to the secondary memory.

27. The memory system of claim 22, wherein the cache memory is internal to the primary memory and a second cache memory is internal to the secondary memory.

28. The memory system of claim 22, wherein the primary memory is a DRAM memory.

29. The memory system of claim 22, wherein the secondary memory is a DRAM memory.

30. The memory system of claim 22, wherein a connection between the controller and the primary memory is a differential connection.

31. The memory system of claim 22, wherein a connection between the controller and the primary memory is a single-ended connection.

32. The memory system of claim 22, wherein a connection between the primary memory and the secondary memory is a differential connection.

33. The memory system of claim 22, wherein a connection between the primary memory and the secondary memory is a single-ended connection.

* * * * *